US012675262B1

(12) United States Patent
   Christakis et al.

(10) Patent No.: US 12,675,262 B1
(45) Date of Patent: Jul. 7, 2026

(54) ONLINE DEVELOPMENT ENVIRONMENT USING GENERATIVE RESPONSE ENGINE

(71) Applicant: OpenAI OpCo, LLC, San Francisco, CA (US)

(72) Inventors: Alexander Christakis, San Francisco, CA (US); Bryant Jow, Palo Alto, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/303,790

(22) Filed: Aug. 19, 2025

Related U.S. Application Data

(60) Provisional application No. 63/800,246, filed on May 5, 2025.

(51) Int. Cl.
   *G06F 8/38*      (2018.01)
   *G06F 8/34*      (2018.01)
   *G06F 9/451*     (2018.01)

(52) U.S. Cl.
   CPC .................. *G06F 8/38* (2013.01); *G06F 8/34* (2013.01); *G06F 9/451* (2018.02)

(58) Field of Classification Search
   CPC .............. G06F 8/34; G06F 8/38; G06F 9/451
   USPC ................................................. 717/101–123
   See application file for complete search history.

(56) References Cited

U.S. PATENT DOCUMENTS

| | | | |
|---|---|---|---|
| 10,742,398 B2 * | 8/2020 | Rosenoer | H04L 9/0643 |
| 12,020,005 B2 * | 6/2024 | Henry | G06F 8/38 |
| 12,387,036 B1 * | 8/2025 | Elsen | G06V 10/803 |

OTHER PUBLICATIONS

Vaithilingam et al., "Bespoke: Interactively Synthesizing Custom GUIs from Command-Line Applications by Demonstration" 2019, ACM, pp. 563-576. (Year: 2019).*
Zhao et al., "Enhancing LLM-Based Automated Program Repair with Design Rationales", 2024, arXiv, 12 pages. (Year: 2024).*
Nandy et al., "Bespoke: Using LLM agents to generate just-in-time interfaces by reasoning about user intent", 2024, ACM, pp. 78-81. (Year: 2024).*
Cao et al., "Generative and Malleable User Interfaces with Generative and Evolving Task-Driven Data Model", Mar. 2025, arXiv, 20 pages. (Year: 2025).*

* cited by examiner

*Primary Examiner* — Ted T. Vo
(74) *Attorney, Agent, or Firm* — Polsinelli PC

(57)                ABSTRACT

Disclosed are systems, apparatuses, processes, and computer-readable media for real-time modes of a generative response engine. The present technology relates to an app generator for generating bespoke applications with a generative response engine. A method of the present technology includes receiving, by a front end to a generative response engine, a first prompt to generate a bespoke application, wherein the front end includes a prompt input and a main content, obtain code for the bespoke application; execute the code for the bespoke application; based on the executing the code for the bespoke application, render a user interface of the bespoke application within the main content area of the front end; receive a first input into a component of the user interface to adjust a visual aspect of the component; and generate a modification to a first code subset to correspond the visual aspect of the user interface.

30 Claims, 15 Drawing Sheets

500

504

500

700

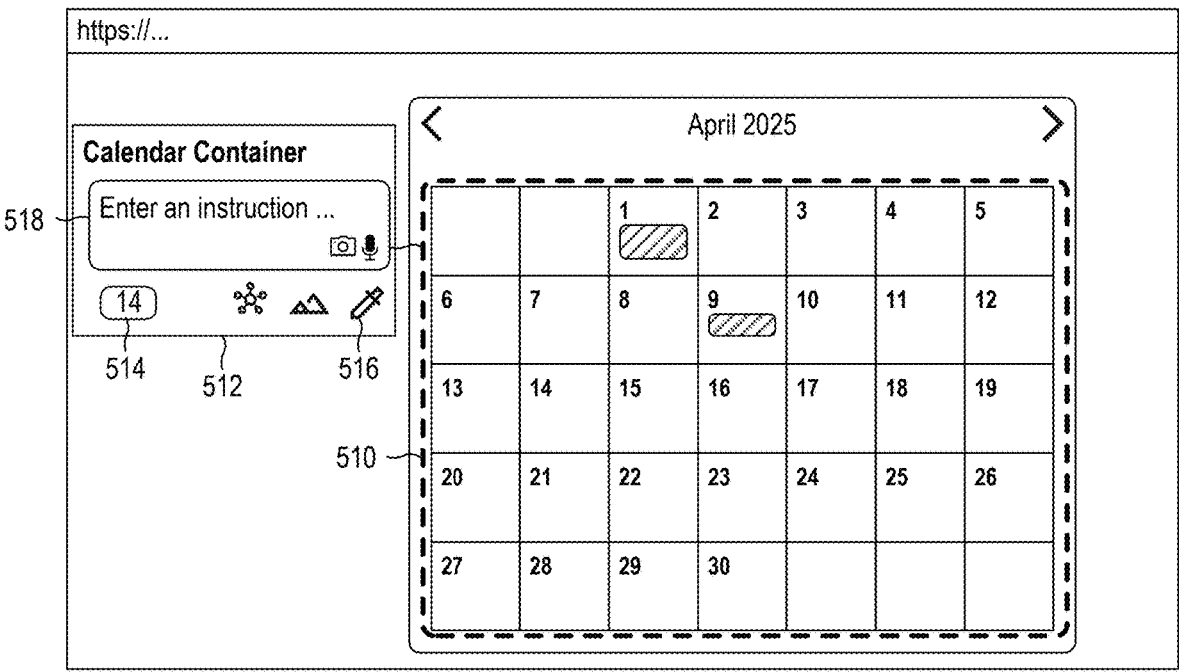

```
client
  package.json
  vite.config.json
  src
    main.tsx
    App.tsx
    components
      Navbar.tsx
      Footer.tsx
      pages
      Home.tsx
      About.tsx
server
  package.json
  server.ts
  src
    routes
    auth.ts
```

```
import { createClient } from "@supabase/supabase-js"
import { SUPABASE_AUTH_KEY } from "@/utils"

const supabase = createClient(SUPABASE_AUTH_KEY)

export const fetchElements = async() => {
  ...
}
```

```
import * as React from "React"
import {Calendar, ProtectedRouter } from "@/components"

function App() { //Validate auth credentials
  return (
    <ProtectedRouter>
      <Calender>
      <Fallback component={<MainPage />}
    </ProtetedRouter>
```

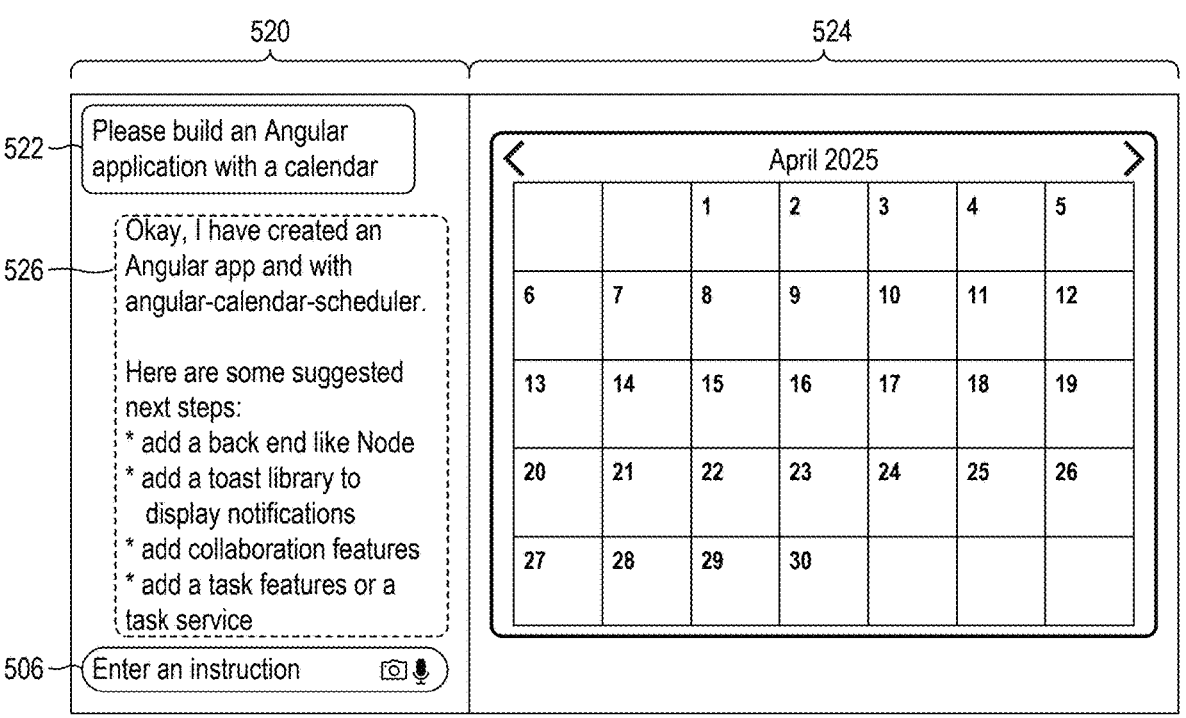

522 — Please build an Angular application with a calendar

526 — Okay, I have created an Angular app and with angular-calendar-scheduler.

Here are some suggested next steps:
* add a back end like Node
* add a toast library to display notifications
* add collaboration features
* add a task features or a task service 506 — Enter an instruction April 2025

| | | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | | | |

FIG. 5E

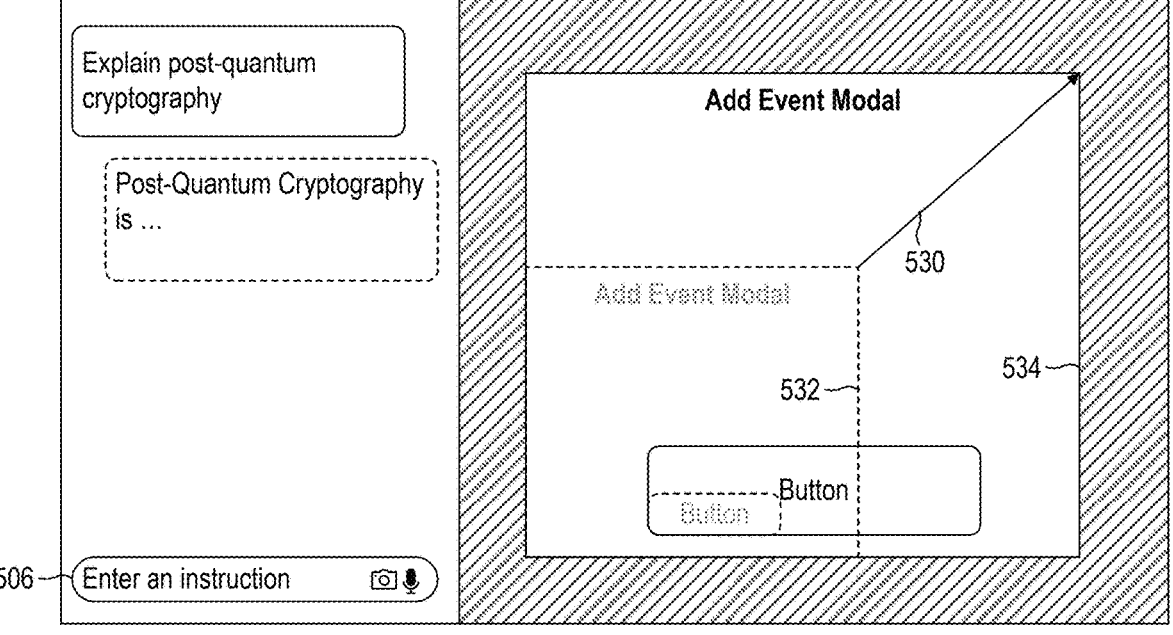

Explain post-quantum cryptography

Post-Quantum Cryptography is ...

506 — Enter an instruction

Add Event Modal

530

Add Event Modal

532

534

Button

Button

SVG Editor

Enter an instruction ...

Meeting Frequency

700

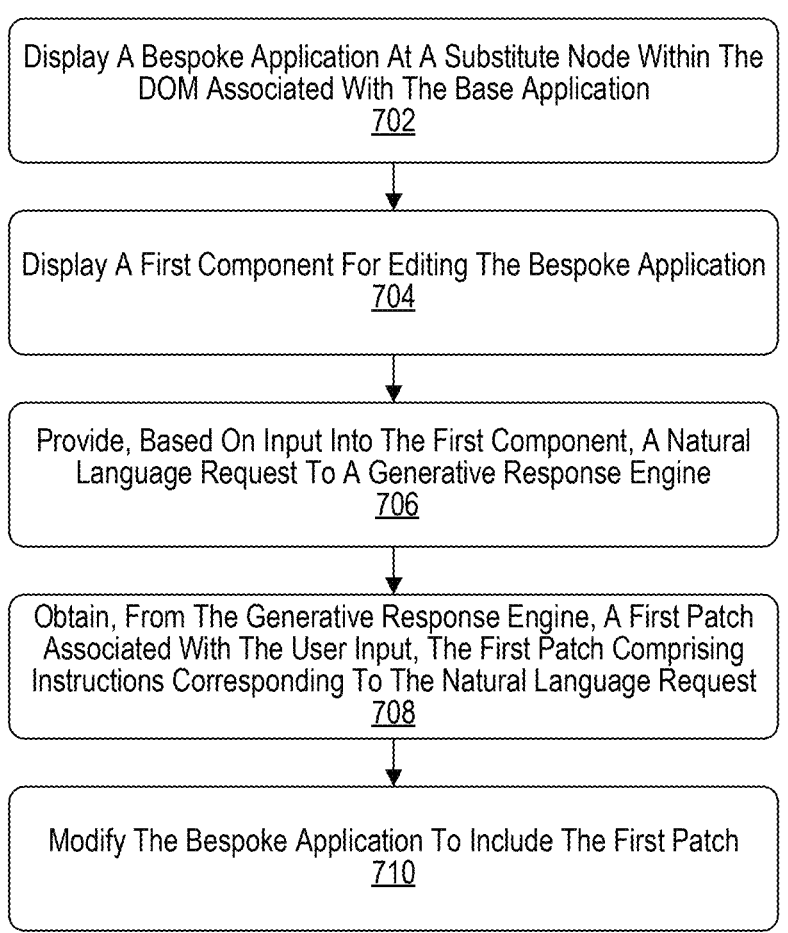

Display A Bespoke Application At A Substitute Node Within The
DOM Associated With The Base Application
702

Display A First Component For Editing The Bespoke Application
704

Provide, Based On Input Into The First Component, A Natural
Language Request To A Generative Response Engine
706

Obtain, From The Generative Response Engine, A First Patch
Associated With The User Input, The First Patch Comprising
Instructions Corresponding To The Natural Language Request
708

Modify The Bespoke Application To Include The First Patch
710

FIG. 7A

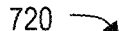

720

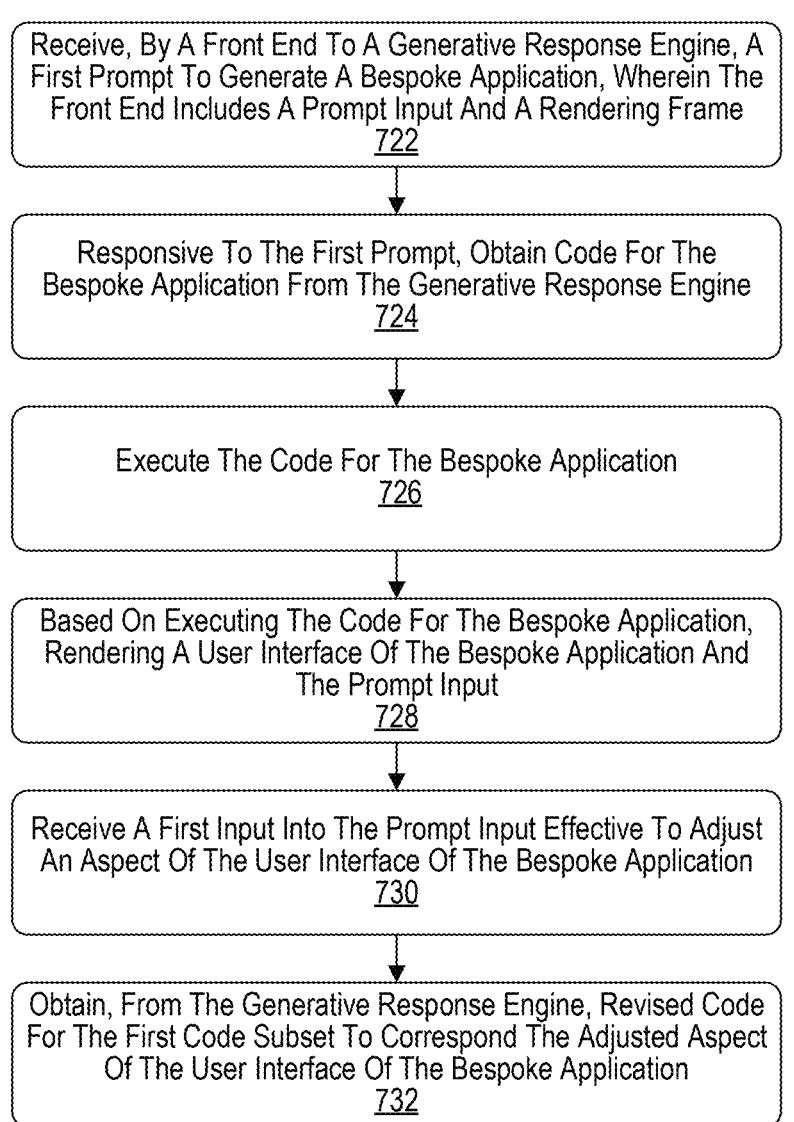

Receive, By A Front End To A Generative Response Engine, A First Prompt To Generate A Bespoke Application, Wherein The Front End Includes A Prompt Input And A Rendering Frame
722

Responsive To The First Prompt, Obtain Code For The Bespoke Application From The Generative Response Engine
724

Execute The Code For The Bespoke Application
726

Based On Executing The Code For The Bespoke Application, Rendering A User Interface Of The Bespoke Application And The Prompt Input
728

Receive A First Input Into The Prompt Input Effective To Adjust An Aspect Of The User Interface Of The Bespoke Application
730

Obtain, From The Generative Response Engine, Revised Code For The First Code Subset To Correspond The Adjusted Aspect Of The User Interface Of The Bespoke Application
732

ENCODE BLOCK 910

DECODE BLOCK 914

ONLINE DEVELOPMENT ENVIRONMENT USING GENERATIVE RESPONSE ENGINE

CROSS-REFERENCE TO RELATED APPLICATIONS

This application claims the benefit of priority to U.S. provisional application No. 63/800,246, filed on May 5, 2025, entitled ONLINE DEVELOPMENT ENVIRON-MENT USING GENERATIVE RESPONSE ENGINE, which is expressly incorporated by reference herein in its entirety.

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIGS. 5A-5F illustrate an app generator configured to edit a bespoke application in conjunction with a generative response engine in accordance with some aspects of the disclosure;

FIG. 7A is a flow diagram of a process for generating a bespoke application in accordance with some aspects of the disclosure;

FIG. 7B is a flow diagram of another process for generating a bespoke application in accordance with some aspects of the disclosure

DESCRIPTION

Figure 1:
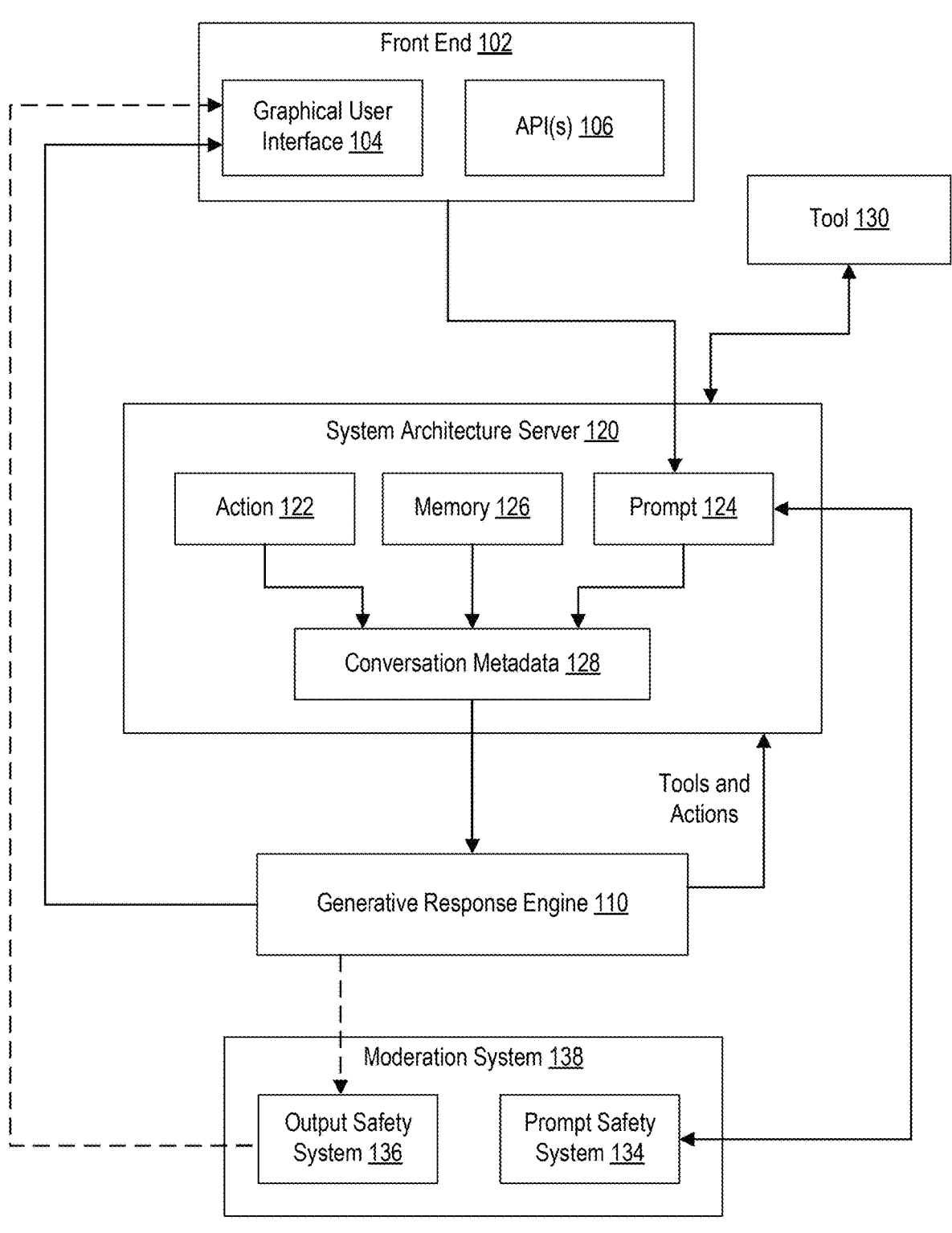
FIG. 1 illustrates an example system supporting a generative response engine during inference operations in accordance with some aspects of the present disclosure.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation.

Web applications are software programs that run in a web browser and provide interactive and dynamic experiences without installation. Web applications are generally a part of a technology stack including a server and storage mechanisms that were introduced based on advances in web technologies like hypertext markup language (HTML), cascading style sheets (CSS), and JavaScript. Unlike traditional desktop applications, web apps are accessible from any device with an internet connection, making them highly versatile and platform-independent. Asynchronous JavaScript and extensible markup language (XML) revolutionized web applications by enabling asynchronous data loading, allowing pages to update content dynamically without needing a full reload, greatly enhancing user experience and interactivity. Modern web applications use a bundler (e.g., Webpack) or a development server (e.g., Vite) that takes various assets (e.g., JavaScript, CSS, and images) and combines the assets into optimized files for efficient loading in a web application. Web applications also include a variety of rendering strategies that have various issues (e.g., pure client side apps have poor indexing for search engines, server side apps have increased architectural complexity, etc.).

Online integrated development environments (IDE) were developed to help developers build and share web applications using the various technologies such as webassembly, TypeScript, and so forth. Online IDEs create virtualized environments that allow instant project creation, real-time previews, and easy sharing. Online IDEs also allow rapid testing of libraries, third party services, and many other features. For example, a person can easily test a package and does not worry about cumbersome package management issues associated with local development (e.g., install libraries locally on a development computer). These features make online IDEs ideal for rapid prototyping, education, and collaboration by streamlining the development process and removing setup barriers.

Development within an online IDE is still difficult because some complexities, such as the typescript configuration and the development server, are abstracted away and cannot be modified. Package management, implementation of packages, and modifications of the application are still manual processes and require a user to directly make edits into the code within a portion of the viewport that is separate from the bespoke applications. In addition, these environments are also generally limited to client-side rendered applications and do not support modern hybrid rendering applications without a full container (e.g., Docker).

Systems, apparatuses, processes (also referred to as methods), and computer-readable media (collectively referred to as "systems and techniques") are described herein for real-time modes of a generative response engine in accordance with some aspects of the disclosure. For example, a computing device may execute an app generator to generate a bespoke application in conjunction with a generative response engine. The computing device may scaffold a bespoke application based on user input into an app generator and display the bespoke application at a substitute node within the DOM associated with the app generator. In some aspects, the computing device may display a first component for editing the bespoke application. The first component can be expressly associated with a specific node of the bespoke application based on an input event (e.g., a hover) and is rendered in the same viewport area as the node. The first component is part of the app generator and is not associated with the bespoke app, but is intuitively rendered to allow modification.

The computing device may provide, based on input into the first component, a natural language request to a generative response engine to modify the bespoke application. In response, the computing device may obtain, from the generative response engine, a first patch associated with the user input including instructions corresponding to the natural language request and modify the bespoke application to include the first patch.

FIG. 1 illustrates an example AI assistant service supporting a generative response engine during inference operations in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from a human or a software entity (AI or applications). The prompt is generally in natural language but could be in code, including binary. Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., autoregressive transformer architecture) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses the graphical user interface 104 and Application Programming Interfaces (APIs) 106 that facilitate communication, input processing, and output presentation. Generally, users interact through a graphical user interface 104 that often includes a conversational interface, and applications interact through the API 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some aspects, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. For example, a language model is generally configured to accept text, but when the generative response engine is a multi-modal generative response engine, the front end 102 can accept voice and images/video.

In some aspects, front end 102 can be an interface to accept any input types as part of the prompt, and downstream services can determine which generative response engine or collection of generative response engines are best suited to respond to the prompt.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. In an example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints. There can be levels of system prompts. A highest level of a system prompt might be provided by the generative response engine 110 provider and is meant to establish policies for the behavior of generative response engine 110. This highest level system prompt is prohibited from being edited. A customization system prompt can be used to customize the behavior of the generative response engine and is often provided through an API call, or provided by a user account when creating a customized version of generative response engine 110. A still lower level of system prompt might include hidden information about a task. This can include chain-of-thought from a reasoning model, or context about an application the generative response engine 110 is working with to complete a task. Accordingly, the graphical user interface 104 does not always display all of the output of the generative response engine.

The graphical user interface 104 is also configured to display the responses from the generative response engine, which might include text, code snippets, images, or interactive elements.

In some aspects, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document.

In some aspects, the generative response engine 110 can provide instructions memory 126 to record facts in a personalization notepad, and front end 102 can be configured to notify the user account that a memory was created.

As noted above, the front end 102 can also provide one or more application programming interfaces (API(s)) 106. APIs enable developers to integrate the generative response engine's capabilities into external applications and services. They provide programmatic access to the generative response engine, allowing for customized interactions and functionalities. While APIs 106 are shown as part of a front end 102, this illustration takes the liberty of locating API 106 in front end 102 to refer to points of access to generative response engine 110 (i.e., graphical user interface 104 and APIs 106 are points of access and generative response engine 110 sends and receives messages to them in similar ways). In reality, API 106 endpoints are located at context management service 120.

The APIs 106 can accept structured requests containing prompts, context, and configuration parameters. For example, an API can be used to provide prompts and divide the prompt into system prompts and user prompts. In some aspects, the APIs 106 can provide specific inputs for which the generative response engine 110 is configured to respond with a specific behavior. For example, an API can be used to specify that it receives an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the AI assistant service 100's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might use other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a context management service 120. The function of context management service 120 is to manage and organize the flow of data among key subsystems, enabling the generative response engine 110 to generate responses that are contextually relevant, accurate, and enriched with additional information.

Action 122 facilitates auxiliary tasks that extend beyond basic text generation. In some aspects, action 122 can be actions that correspond to an API 106. In some aspects, action 122 can be agentic actions that the generative response engine 110 decides to take to carry out a user's intent as described in the prompt. For example, an action can be to call tool 130 or even another generative response engine 110.

Prompt 124 is the request or command provided by the user account through front end 102. In some aspects, prompt 124 can be further supplemented by a system prompt and other information that might be included by graphical user interface 104 or API 106 or associated with a custom generative response engine 110. In some aspects, prompt 124 can even be modified or enhanced by generative response engine 110 as addressed further below. Additionally, as the user account provides prompts and generative response engine 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by generative response engine 110 can include a thread of user-provided messages and responses from generative response engine 110 in a multi-turn conversation. The actors in the conversation thread can be labeled so that generative response engine 110 can review the turns of the conversation. Generally, prompt 124 will include an entire conversation thread, but in some instances, prompt 124 can be shortened if it exceeds a maximum accepted length (generally measured by a number of tokens).

Context management service 120 can also route prompts and response through moderation system 138. In some aspects, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some aspects, prompt safety system 134 can utilize text pattern matching, classifiers, and/or other AI techniques.

Since prompts can evolve over time through the course of a conversation, consisting of prompts and responses, prompts can be repeatedly evaluated at each turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some aspects, memory can be recorded at the instruction of generative response engine 110 when generative response engine 110 identifies a fact or data that it determines should be saved in memory because it might be useful in later conversations or sessions. In some aspects, memory 126 can also include synthesized concepts extracted from past conversation threads, and memory 126 can also encompass the ability of generative response engine 110 to search through past interactions to find relevant information to a current conversation thread.

Conversation metadata 128 can aggregate data points relevant to the conversation, including user prompt 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from context management service 120) and generates outputs. In some aspects, the generative response engine is a generative transformer, or autoregressive transformer, but it could utilize other architectures. In some examples, the transformer is multi-modal transformer that can use audio tokens (or embeddings thereof), visual tokens (or embeddings thereof), and language (or embeddings thereof) as needed.

A core feature of the generative response engine 110 is to generate content in response to prompts. The generative response engine 110 is configured to receive inputs from front end 102 that provide guidance on a desired output. The generative response engine can analyze the input and identify relevant patterns and associations in the data, and it has learned to generate a sequence of tokens that are predicted as the most likely continuation of the input. The generative response engine 110 generates responses by sampling from the probability distribution of possible tokens, guided by the patterns observed during its training. Two features of the autoregressive transformer that result in this functionality are that the autoregressive transformer might use only the decoder part of the transformer architecture and that it utilizes self-attention. By utilizing the decoder part of the transformer architecture, the transformer focuses on predicting the tokens given the previous context tokens. And the self-attention mechanism captures long-range dependencies amongst tokens, allowing it to generate contextually relevant responses (in text, audio, images, and video).

In some aspects, the generative response engine 110 can generate multiple possible responses before presenting the final one. The generative response engine 110 can generate multiple responses based on the input, and these responses are variations that the generative response engine 110 considers potentially relevant and coherent.

In some aspects, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some aspects, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some aspects, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it should interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it should plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user. In another example, some generative response engine 110 are reasoning models, which are generative response engine 110 that are configured to output a raw chain-of-thought before preparing a final response to a prompt. The raw chain-of-thought might not be presented to a user account or application calling an API. Instead, another generative response engine 110 might summarize the raw chain-of-thought into a more consumable and useful output for the user account or application.

In some aspects, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some aspects, the responses might be returned by way of context management service 120.

Figure 2:
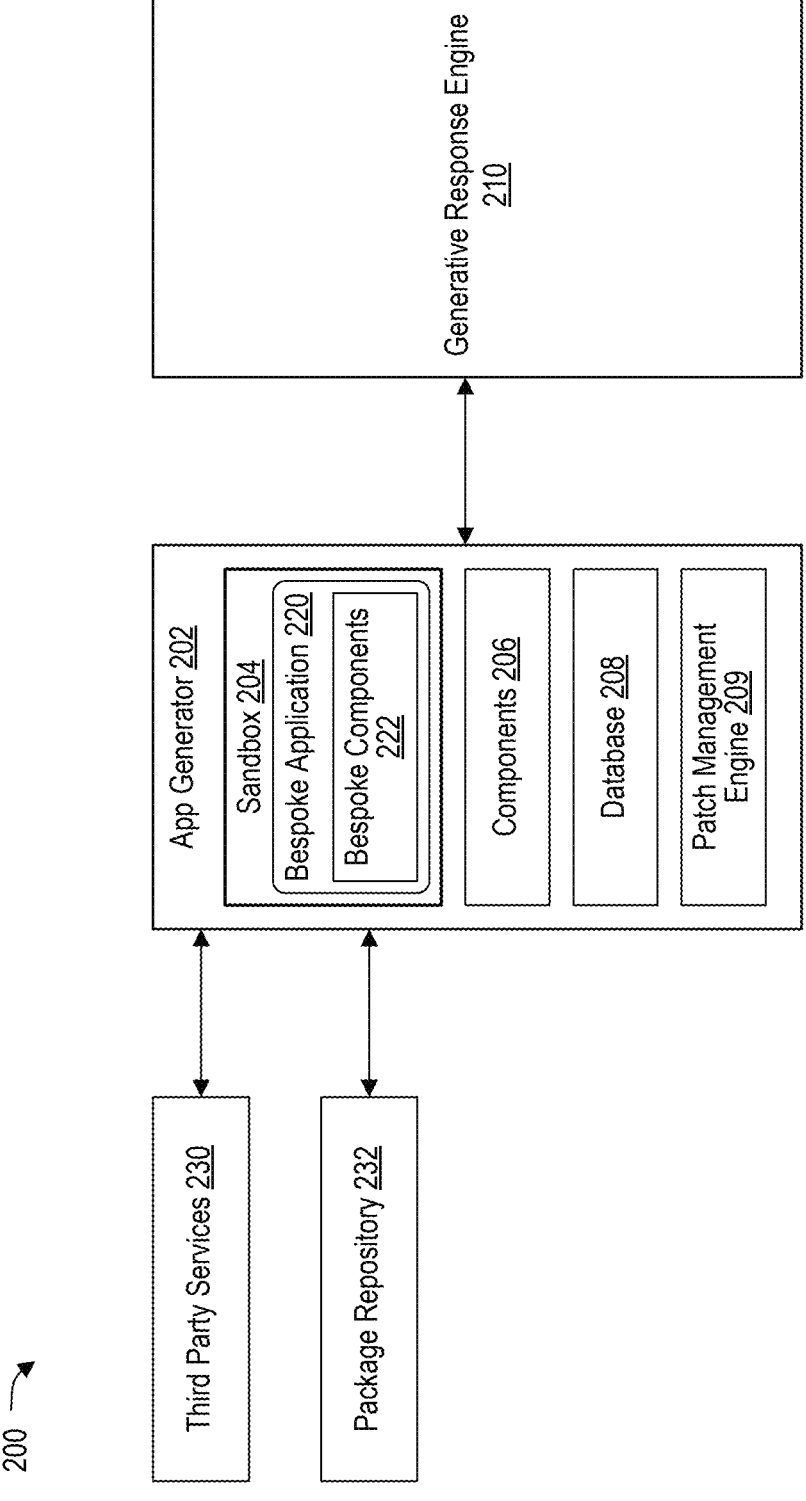
FIG. 2 is a conceptual block diagram of an interactive application generator system integrated with a generative response engine in accordance with some aspects of the disclosure.

FIG. 2 is a conceptual block diagram of an interactive application generator system 200 integrated with a generative response engine 210 in accordance with some aspects of the disclosure. In some aspects, app generator 202 (e.g., an application built for generating and instrumenting other applications) is configured to interact with generative response engine 210. App generator 202 includes sandbox 204 that contains and limits interactions by bespoke application 220. In some aspects, app generator 202 also includes a plurality of components 206, database 208, and patch management engine 209.

FIG. 2 illustrates the logical organization of app generator 202 and how the different aspects are connected, isolated, and various scope. The scope is the permitted boundaries of contents. For example, the scope of the bespoke application 220 is limited by the sandbox 204. Scope defines where a variable or function can be accessed, for example, a variable defined inside a function can't be used outside that function.

The sandbox 204 is a containerized environment that allows users to write, run, and preview code associated with a bespoke application 220 without installing any software locally. The sandbox 204 comprises a virtual container or a simulated runtime that safely executes code and limits interaction to prevent the code from acting dangerously. In some aspects, sandbox 204 ensures that the code cannot access or affect the host system or user's environments. For example, sandbox 204 limits access to low-level system APIs, file systems, or persistent server processes to prevent abuse and ensure consistent performance across different sessions. The sandbox 204 supports modern web development features including different servers (e.g., Node, Deno, etc.), module bundling, dependency management (e.g., package management), and real-time previews.

The app generator 202 includes various components 206 to interact with bespoke application 220 and create and customize bespoke application 220. A component 206 is a reusable, self-contained unit of code that encapsulates structure, style, and behavior, to build user interfaces in modern development frameworks. Components are often composed together to create different types of abstractions, layouts, and effects. For example, a simple component can be a button, a layout effect (e.g., a CSS grid layout), a menu, a context menu, and so forth. Components may also be a polymorphic component which allows a root element to be changed. For example, for a custom button component, a root element can be an HTML button, but a button with polymorphic features could be changed to be an anchor link (e.g., <a>, etc.).

In some aspects, component 206 includes an instrumentation component that is configured to identify a node associated with a bespoke component in bespoke application 220 and instrument the bespoke component with styling, functionality, and so forth. In some aspects, in a web application, a node is an HTML element (e.g., a div, etc.) and can be included with a component. Components also have a root node that contains other child content (e.g. child nodes, child components, etc.). In some aspects, the instrumentation component can be configured to be displayed proximate to a selected bespoke component as further described below to allow customization. The instrumentation component can be dynamically configured by a natural language input to allow complex interaction with generative response engine 210. For example, the instrumentation component can display features corresponding to dates when the bespoke component (e.g., a calendar) is related to dates and scheduling.

The components 206 may also include a concurrent task component. A concurrent task component is configured to capture a snapshot of bespoke application 220 before execution of a long task that runs in parallel with other actions, and interact with a generative response engine 210 to construct features that consist of multiple tasks. For example, a concurrent task component can generate a component that interacts with a third party service 230 and adds external functionality to bespoke application 220.

The app generator 202 is configured to generate bespoke application 220 based on an interactive user interface that allows components 206 of app generator 202 to render over bespoke application 220. For example, component 206 may be a function that is called during rendering (e.g., a React component) that generates a node that is dynamically inserted into the DOM (e.g., using JSX). In some aspects, because bespoke components 222 of bespoke application 220 includes a unique identifier that is known to app generator 202, app generator 202 can use various techniques (e.g., a lower level API in React, injection based on the unique identifier using a node reference, etc.) to cause components 206 to render in conjunction with bespoke components 222.

Unique identifiers that are injected into bespoke components 222 of bespoke application 220 can be generated in various ways, such as a universally unique identifier (UUID). A UUID is a 128-bit label that includes various features such as a MAC address, random information, and a unique clock sequence, to generate a universally unique identifier. In other cases, other types of random identifiers can be used that are sufficient to statistically ensure that no two identifiers can collide (e.g., have the same value). In another example, a counter can be used, and so forth.

In some aspects, app generator 202 adds various event handlers, identifiers, and other functions to bespoke application 220 within sandbox 204 to allow events in bespoke application 220 to trigger events by app generator 202, which is sometimes referred to a bubbling up a hierarchy of an application. These event handlers and other functions are inserted at runtime and are not inserted into the actual code or rendered by bespoke application 220 in production (e.g., when deployed for public use). As an example, app generator 202 is configured to identify mouse events (e.g., hover, click, etc.) or touch events associated with corresponding bespoke component 222. For example, based on the unique identifier applied to bespoke components 222, app generator 202 may be configured to detect corresponding mouse events (click, hover, drag, etc.). In some cases, bespoke components 222 can be graphically manipulated based on drag and drop interactions. For example, app generator 202 can provide add event handlers to bespoke components 222 to allow a user to change graphical layout. Table 1 below illustrates an example of code of a component of a component and runtime code after injection by app generator 202 to include a unique identifier (e.g., id) and an onMouseOver event. For example, the onMouseOver is a callback function that is executed with arguments (e.g., the event and the identifier) when the mouse hovers over the component. In this case, the identifier is provided with to the callback function so that the app generator 202 can map the event to the corresponding component. In some aspects, in the context of a React application, a component is a function that returns JSX (illustrated in Table 1 and Table 3). Components for other platforms may be different.

TABLE 1

```
function example ( ) {
    return (<div>This is an example component</div>)
}
// at Runtime, injected to include a unique id and a mouse over event
function example (id: string, onMouseOver: (event, id) => void) {
    return (
        <div id={id} onMouseOver={ (e) => onMouseOver (e, id) }>
        This is an example component
        </div>
    ) }
```

App generator 202 may display component 206 within the view (e.g., the browser's viewport) of bespoke application 220 without affecting layout/render of bespoke components 222. For example, when bespoke application 220 is being edited by app generator 202, events that occur within bespoke application 220 (e.g., a mouse hover over a bespoke component 222) are detected by app generator 202 using the instrumentation. For example, the popup API (e.g., window.openWindow( )) is a proposal that is not standardized by the technical committees and provides fine-grained control over opening and interacting with popup windows. For example, the previous techniques for popup windows (window.open( )) relied on passing a URL and a string of comma-separated values and did not over sufficient control and no structured communication between windows. The previous techniques were often blocked by browsers due to abuse as there was no mechanism for authorizing control to the function.

In some aspects, app generator 202 is configured to receive various types of prompts, both structured and unstructured, to generative response engine 210 to generate instructions, styling, identify packages, and other interactions to build bespoke application 220. App generator 202 can also use function calling, which allows deterministic functions to be implemented concurrently identification of features during inference.

The app generator 202 may also include database 208 that can be used by app generator 202 or by bespoke application 220. For example, sandbox 204 can limit access to generative response engine 210 to permit complex data accessing features from sandbox 204. For example, database 208 can store, retrieve, and manage data for bespoke application 220. Examples of data include user inputs, authentication details, content, or settings, internationalization content, etc. In some cases, generative response engine 210 may be a cloud-hosted database (e.g., Firebase, Supabase, MongoDB Atlas, PostgreSQL, etc.). The generative response engine 210 can also include built-in mock data for prototyping and testing. For example, a user may request app generator 202 to generate mock data based on a few samples to test specific features, and allow a user to build full-stack applications (e.g., a full stack from client to database), test functionality, and simulate real-world data interactions all within the online IDE environment.

App generator 202 may also include patch management engine 209 for merging different patches, unmerging patches, and so forth. For example, a patch management function such as Git coordinates changes across parallel development workflows, especially in collaborative or online environments. Edits to a project (e.g., bespoke application 220) can be captured as a patch or a discrete set of modifications. For example, a patch may be a diff (e.g., using a longest common subsequence) of different files that identify features that have changed. The patch may also include a dependency graph to map the changes associated with the diff. In some cases, the patch may include an identification of a module to check for conflicts, conflict resolution, etc. The app generator 202 is configured to allow these edits to be tracked, compared, and merged selectively or sequentially with the patches to ensure that updates are integrated without overwriting or conflicting with each other. In some aspects, the concurrent task component can perform edits associated with a long patch while allowing a user to perform edits with a short patch. Patch management engine 209 allows the patches to be applied and merged (e.g., a rebase operation) out of order. Patches are generally software instructions, but may also be styling features, configuration files, and so forth.

The app generator 202 is also configured to interact with a third party service 230 to add functionality to bespoke application 220. Non-limiting examples of a third party service 230 include public or private APIs (e.g., weather, calendar function, object storage such as S3, email, etc.) that can be instrumented into bespoke application 220 by the generative response engine 210. For example, generative response engine 210 can generate a bespoke component based on prompts provided to generative response engine 210 (e.g., structured JSON prompts, natural language prompts, etc.). The bespoke components can include code and styling (e.g., CSS, etc.) to present suitable information associated with the third party service 230. For example, a bespoke component may pertain to weather features, and may display a current temperature, and the bespoke component can change styling information (e.g., the background) to correspond to a forecasted high or other weather data.

In some aspects, app generator 202 is also configured to operate with at least one package repository 232 (e.g., NPM) to retrieve packages associated with bespoke application 220. For example, organizations that allow API access to various services (e.g., either free or charged by access) may distribute packages to interact with their services (e.g., S3, etc.) to reduce barriers and encourage usage of their services.

In some aspects, app generator 202 is described as configuring a JavaScript application for purposes of simplicity. The app generator 202 can configure and sandbox various types of applications using different frameworks (e.g., Go, Vue, Preact, Blazor, a container-based application in Docket, ReactNative, Remotion, etc.) and different languages corresponding to the different frameworks. app generator 202 may also be configured as any suitable application type and is not limited to a JavaScript framework (e.g., WASM, etc.).

In some aspects, app generator 202 may also include a patch generation engine (not shown) for generating and merging patches. For example, generative response engine 210 may provide output code to app generator 202, and app generator 202 can generate the patch locally since all code is local at the device executing app generator 202.

Figure 3:
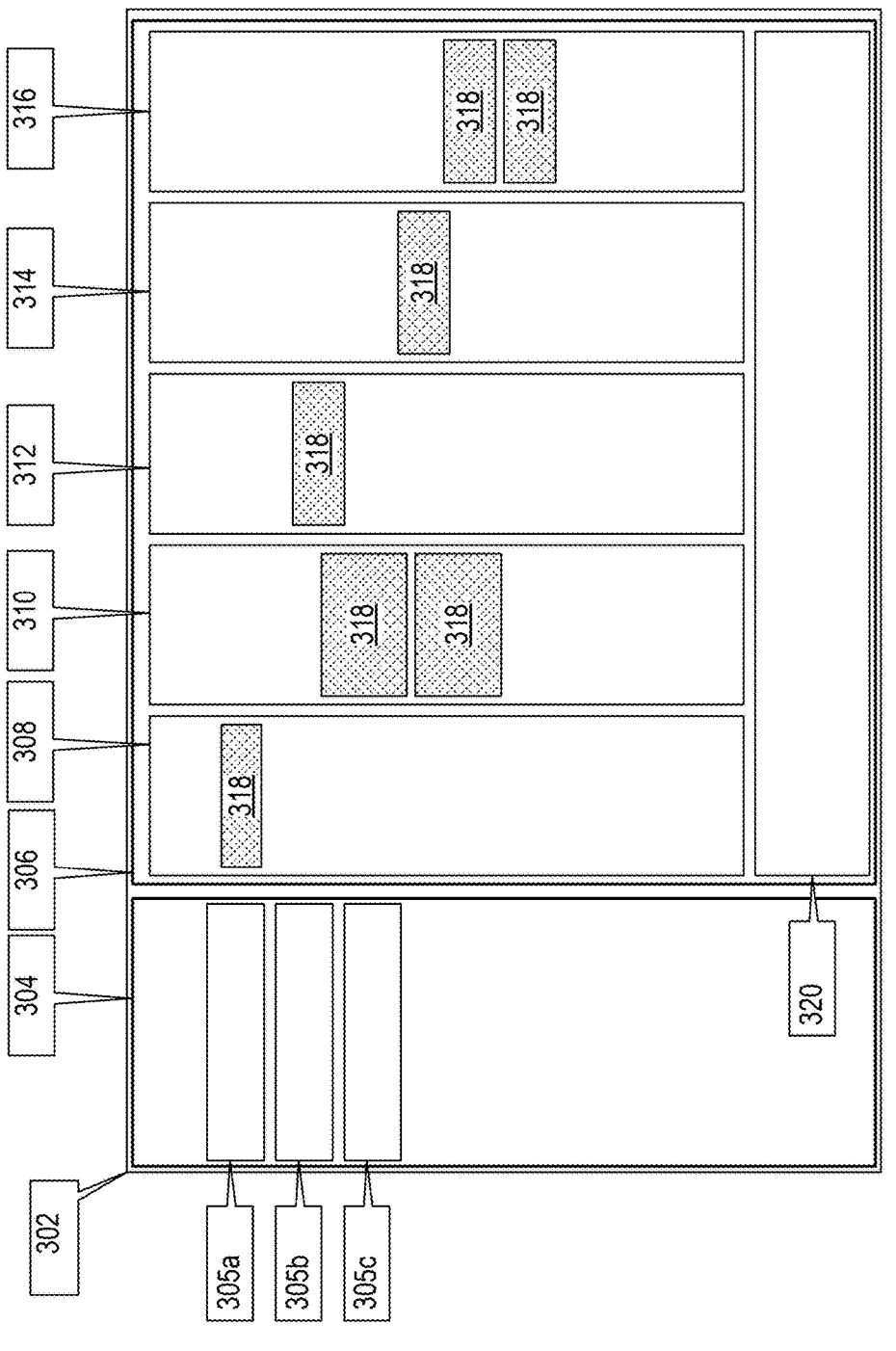
FIG. 3 is a wireframe associated with a bespoke application being generated by an application generator in accordance with some aspects of the disclosure.

FIG. 3 is a wireframe 300 associated with a bespoke application (e.g., bespoke application 220) being generated by an application generator in accordance with some aspects of the disclosure. A wireframe 300 represents a layout of the different nodes within a DOM based on layout features (e.g., CSS) applied to the different nodes to create different application. For example, the wireframe 300 may illustrate a weekly calendar for displaying different days as further described below and is provided examples of different nodes with different identifiers to allow events within the wireframe 300 to be connected to the app generator.

In some aspects, a bespoke application (e.g., bespoke application 220) comprises various HTML nodes that begins with a root element. The root element, which is identified by the id attribute in the root <div> element, defines the rendered boundary of the application, as shown in Table 2.

TABLE 2

```
<!DOCTYPE html>
<html lang="en">
  <head>
    <meta charset="UTF-8" />
    <link rel="icon" type="image/svg+xml" href="/app. svg" />
    <meta name="viewport" content="width=device-width, initial-
    scale=1.0" />
    <title>Bespoke Application</title>
  </head>
  <body>
    <div id="root"></div>
    <script type="module" src="/src/main. tsx"></script>
  </body>
</html>
```

In some aspects, the bespoke application (e.g., main.tsx within the JavaScript bundle) is configured to bootstrap the root element (e.g., document.getElementById("root") as HTMLElement) and then dynamically render the DOM based on the root element. In some aspects, the app generator (e.g., app generator 202 in FIG. 2) is configured to contain the bespoke application by modifying or emulating a root node within the bespoke application. For example, Table 3, below, is a conceptual markup of an app generator and a bespoke application.

```
<!DOCTYPE html>
<html lang="en">
  <head>
    <meta charset="UTF-8" />
    <link rel="icon" type="image/svg+xml" href="/app. svg" />
    <meta name="viewport" content="width=device-width,
    initial-scale=1.0"
    />
    <title>Bespoke Application</title>
  </head>
  <body>
    <div id="app-generator-root">
      <main />
        <navbar />
        <content>
          <div id="bespoke-application-root" />
      </div>
      <script type="module" src="/src/main. tsx"></script>
  </body>
</html>
```

The index.html illustrated in Table 3 is conceptual markup to illustrate how the app generator encapsulates child elements of the bespoke application. Wireframe 300 illustrates various aspects and identifiers associated with a portion of components (e.g., bespoke components 222) of the bespoke application. Table 4 illustrates a hierarchical representation of React components that roughly corresponds to the wireframe 300 as layout detail is removed (e.g., grid layout and flex information to cause the various HTML layout features).

TABLE 4

```
<BespokeApplicationRoot id="302" />
  <Navbar id="304">
    <NavItem text={...} icon={...} onClick={...} id="305a" />
    <NavItem text={...} icon={...} onClick={...} id="305b" />
    <NavItem text={...} icon={...} onClick={...} id="305c" />
  </Navbar>
  <Main id="306">
    <BizWeek>
      <Bizday id="308" day="monday">
        {mondayItems.map (m => (<Block data={m} />) }
      </Bizday>
      <Bizday id="310" day="tuesday">
        { tuesdayItems.map (m => (<Block data={m} />) }
      </Bizday>
      <Bizday id="312" day="wednesday">
        { wednesdayItems.map (m => (< Block data={m} />) }
      </Bizday>
      <Bizday id="314" day="thursday">
        { thursdayItems.map (m => (<Block data= {m} />) }
      </Bizday>
      <Bizday id="316" day="friday" items= {fridayitems} />
    </BizWeek>
    <BizdayCalendarBottomMenu id="320" />
  </Main>
</BespokeApplicationRoot>
```

In some aspects, the reference numerals are used in the identifier attribute to map different aspects of wireframe 300 to the component markup. For example, root component 302 (e.g., BespokeApplicationRoot) defines the bootstrapping element and can be inserted into the app generator. For example, root component 302 is inserted into the div component in Table 3 with the bespoke-application-root identifier. The bespoke application is visually separated into navbar 304 (e.g., also referred to as a side bar) and main area 306 (e.g., also referred to a content area). Navbar 304 includes various navigation options 305a-305c, each with its unique identifier. In some cases, navbar 304 may be dynamic. For example, a variable, navbarItems, can include data for each navigation item and each element can be displayed in navbar 304 using a map operation. A map operation is a function that iterates over every item in an array and returns a value based on a function. In this case, the map operation would invoke a function that displayed the corresponding component.

In some aspects, main area 306 may include a logical group (e.g., BizWeek Calendar) that does not have an identifier because its child elements (e.g., elements between the markup element) handle layout functionality. Main area 306 can also include layout features, such as defining a grid or a flexbox for each child element. In this example, each business day 308, 310, 312, 314, and 316 of a week is rendered by a corresponding BizDay component and each item associated with each day is provided as children components for illustrative purposes, with the exception of Friday. The BizDay component for Friday provides items (fridayItems) as an attribute into the component, which is a more common approach to providing data into the component. Each component associated with each business day 308, 310, 312, 314, and 316 includes a unique identifier to allow interaction with app generator.

Various blocks 318 are illustrated in various business days 308, 310, 312, 314, and 316 and correspond to a feature of the bespoke application. For example, blocks 318 may correspond to a meeting, a task, and so forth, and can be combined with functions in a bottom menu 320 (e.g., add, remove, update, etc.). The structure and functions described with respect to the bespoke application are for illustration purposes to show how identifiers (e.g., the reference numerals associated with FIG. 3) are injected by the app generator to allow interaction. In some aspects, app generator may also add event handlers (e.g., onHover, onFocus, onBlur, etc.) to the bespoke application that send the event and the identifier to the app generator (e.g., app generator 202 of FIG. 2) to generate an effect (e.g., create a component to display near a hovered bespoke component).

Figure 4:
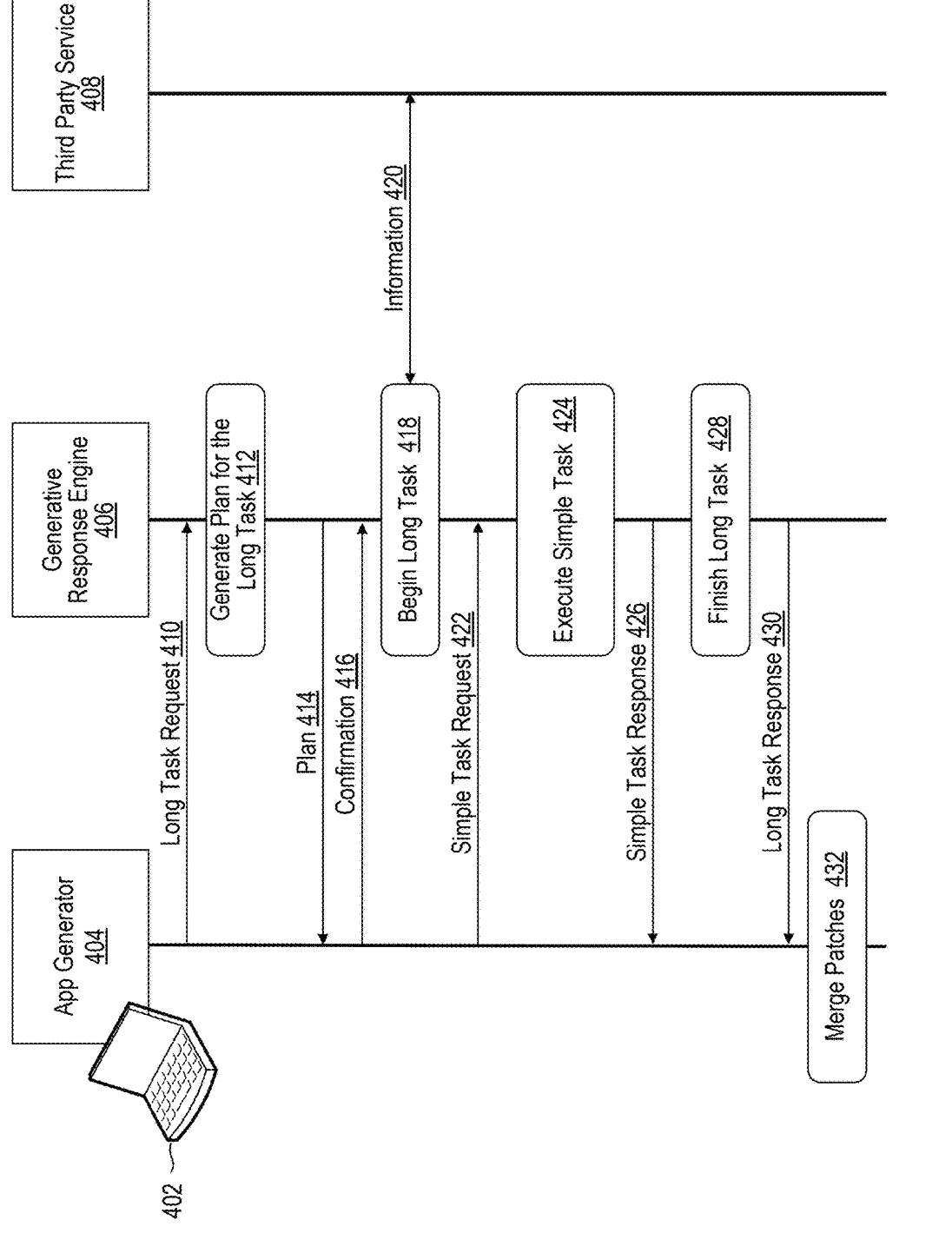
FIG. 4 is a sequence diagram illustrating a concurrent long task using a generative response engine in accordance with some aspects of the disclosure.

FIG. 4 is a sequence diagram 400 illustrating a concurrent long task using a generative response engine in accordance with some aspects of the disclosure. In some aspects, client device 402 is configured to execute app generator 404 (e.g., app generator 202) in conjunction with a generative response engine 406 (e.g., the generative response engine 110). In some cases, a cloud computing service (not shown) including various servers can be positioned between app generator 404 and generative response engine 406. For example, in a server of a cloud computing service can send app generator 404 to client device 402 for local execution. In another example, the server of the cloud computing service can partially execute functions of app generator 404 and send requests to generative response engine 406.

In some aspects, before sequence diagram 400, client device 402 may receive app generator 404 from the cloud computing service and initiate app generator 404. As part of app generator 404, the user may select a type of application to generate, and app generator 404 may scaffold a bespoke application based on user input into an app generator. Scaffolding is the process of automatically generating the basic structure and boilerplate code needed to start building a software project and provides a foundation for further development. For example, the scaffolding includes configuring a development server and various optional aspects, such as a linter or a prettier to automatically check for errors and formatting and various configurations (e.g., package.json, ts.config, biome.json, etc.). The app generator includes at least instructions to render the application at a root node in a DOM, but as noted above, is configured to be rendered into a node within the app generator 404 based on the sandbox. For example, the app generator 404 is configured to display the bespoke application at a substitute node within the DOM associated with the app generator 404 (e.g., the app generator).

In some aspects, the user may input a prompt that causes the app generator 404 to scaffold a bespoke application. For example, the prompt may be a natural language request to generate a calendar application using a framework. App generator 404 sends the prompt to the generative response engine, which generates instructions for execute app generator 404 to perform and configure a bespoke application that includes features associated with the prompt (e.g., application template that is further customized based on various features, such as the calendar).

In some aspects, app generator 404, based on user input, may send a long task request 410 to the generative response engine to perform a long task (e.g., a concurrent long task). For example, app generator 404 may be configured to provide prompts that are explicitly associated with a component (e.g., to customize the components). In some aspects, app generator 404 may also be a general input control that is expressly associated to the bespoke application (e.g., input control 508, etc.) for providing more abstract prompts that affect many components. For example, a long task may be input into the general input control to implement a prompt associated with a long task. A long task is a task that generally takes multiple discrete steps to achieve a result. As an example, a user may request to integrate a weather API or an object storage API such as S3. In either example, an API key may be needed and generative response engine 406 may need to take multiple steps, such as connecting to the object storage, identifying supported features in the S3 (e.g., not all S3 providers implement all features of the S3 API), and build corresponding features based on the supported features.

At block 412, generative response engine 406 receives long task request 410 and generates a plan for the long task. For example, generative response engine 406 generates and sends plan 414 to implement the long task to app generator 404. Plan 414 includes a list of distinct actions to be performed and requests confirmation and further modification by the user. For example, plan 414 includes at least two specific tasks that generative response engine 406 will perform to implement the long task.

In some aspects, app generator 404 obtains plan 414 and displays a plurality of tasks that generative response engine 406 will perform to implement the feature into the bespoke application. App generator 404 may also request input of information to implement the plan, such as an API key. For example, app generator 404 may display an input component for receiving a parameter associated with an external source (e.g., an API key).

Based on user input at app generator 404, app generator 404 may confirm or edit the plan and then provide plan confirmation 416 to generative response engine 406. At block 418, generative response engine 406 is configured to begin execution of a long task based on plan confirmation 416. In some cases, as part of the long task, generative response engine 406 is configured to send and receive information 420 with the third party service 408 to implement the features. The third party service 408 is illustrative as an example and a long task does not necessarily use a third party service 408. The long plan can include various other features, such as generating tests, developing multiple components, implementing a package, and other actions that require additional processing.

In some aspects, the long task is being executed, app generator 404 may send simple task request 422 to generative response engine 406. For example, the simple task request 422 may be limited in scope as compared to the long task. In one example, the simple task request 422 may be a request for modifications to a style (e.g., appearance using CSS) or a functionality of a specific component. In one aspect, app generator 404 is configured to detect a hover over a bespoke component within the bespoke application and may display a dynamic component to allow complex modification to be performed to that node.

In some aspects, the dynamic component is associated with the app generator and may be rendered proximate to a child bespoke component of the bespoke application in connection with generating simple task request 422. In some aspects, app generator 404 may identify nodes of the bespoke component (e.g., text, HTML elements, etc.) and the app generator may generate a user interface to allow dynamic control of features of the component. For example, the dynamic component may determine that the bespoke component includes CSS layout features such as flexbox or grid and may display CSS alignment and justification features based on CSS attributes associated with nodes. For example, if a flexbox is detected, the dynamic component can display options to change features of the flexbox and positioning attributes applied to the child elements. In the event text features are identified, the dynamic component includes user input features to change font styling attributes, background, animations, etc.

The dynamic component may also include a text or rich text input prompt to allow a user to provide specific instructions associated with the corresponding child bespoke. For example, a user may request a date input control (e.g., selecting a single date) to be modified into a date range input control (e.g., selecting a range of dates or multiple dates).

At block 424, generative response engine 406 may receive simple task request 422 and additional information and execute simple task at block 424. In some aspects, the additional information can include the component associated with the request, or other pertinent information (e.g., external functions called by the component, hooks associated with the component, etc.). Generative response engine 406 may identify modifications to make to the component such as visual modifications, layout modifications, properties to apply, additional instructions to include within the component, additional JSX features of the render function of the component, etc. After identifying the changes, generative response engine 406 may generate a first patch that identifies the changes to make in the component and send simple task response 426 to app generator 404 including the first patch.

In some aspects, the first patch includes updated instructions associated with a module, a dependency graph, and an identifier associated with the module. The module comprises one of a function, a class, a hook, or a component (e.g., a function component or a class component), a widget (e.g., in a Flutter app), a view (e.g., in a Swift app), etc. The first patch includes a change to a property of an object having data rendered in the DOM. For example, the first patch changes how and when the objects of the component are rendered. The changes can also be stylistic. For example, the modifications can be purely cosmetic, such as a request to animate features using CSS features. CSS features can be embedded in CSS modules (e.g., componentName.module.css) and do not have to be within a static CSS file (e.g., index CSS) to isolate styling and reduce bundle size.

In some aspects, the simple tasks can be associated with project features, such as development server configuration (e.g., vite.config.json), typescript configuration (e.g., tsconfig.json), linter configuration (e.g., biome.json), environment variables, prettier configuration, etc. For example, updating typescript features can lead to complex changes downstream (e.g., changing imports of CommonJS modules to EcmaScript Modules (ESM), etc.). For example, migrating older configurations to newer configurations is a particular problem due to legacy code, complexities with development servers, external packages used by the applications, type definitions, and so forth. In addition, the new server rendering features (e.g., server side rendering and static site generation) add additional complexity.

App generator 404 is configured to receive simple task response 426 and apply the first patch to the bespoke application. In some aspects, app generator 404 includes a patch management engine (e.g., patch management engine 209) and implements the instructions associated with simple task request 422.

After generative response engine 406 finishes simple task at block 424, at block 428, generative response engine 406 finishes the long task (e.g., using different servers within generative response engine 406) and generates long task response 430 including a second patch to apply to app generator 404. In some aspects, the second patch can include instructions and modifications to modify features associated with the first patch. Generative response engine 406 sends a long task response 430 including the second patch to app generator 404.

At block 432, app generator 404 is configured to merge the first patch of simple task response 426 and the second patch of long task response 430. For example, app generator 404 may be configured to perform a rebase operation, which is a sequence of commits from one branch (e.g., the first patch) and re-applies them on top of another branch (e.g., the second patch) and rewrites the commit history to create a linear progression. In some aspects, app generator 404 displays a merge interface to allow the user to review the conflicting changes and decide which version (or a combination) should be kept. App generator 404 can also include patch management functions, allowing the user to back out changes and then reapply them out of order in some circumstances (e.g., no conflicting code changes).

In some aspects, the modifications and state changes of the bespoke application within app generator 404 occur inline (e.g., using hot module replacement). In some aspects, data does not refresh and maintains state when patches are merged. In some aspects, app generator 404 is configured to prevent reloading of the state even when types change and can drop data from objects without rerendering app generator 404 with an initial state.

The app generator 404 can also be configured to receive additional information pertaining to the features that the user wants implemented. For example, app generator 404 may be configured to receive an image corresponding to an appearance and can interoperate with generative response engine 406 to modify the components of the bespoke application to correspond to the image. For example, a user may provide an image of a dark user interface when the bespoke application is presently on a white image, and app generator 404 and generative response engine 406 are configured to modify the bespoke application to include a dark appearance. In some cases, app generator 404 and generative response engine 406 can generate specific themes to allow users to select a theme (e.g., a light theme or a dark theme).

In some aspects, app generator 404 can also be configured to modify other types of markup content. For example, app generator 404 may be configured to interact with a scalable vector graphic (SVG) to make changes. For example, app generator 404 may modify stylistic appearance of a bar chart in SVG form, or change a bar graph to a line chart, and so forth. App generator 404 may also instrument the SVG to animate the SVG (e.g. to include with a bespoke application). Other types of content can also be modified that have a hierarchical structure. For example, OpenXML documents are all structural and include XML content that app generator 404 can modify, such as extracting specific content that is embedded as metadata, and so forth.

FIGS. 5A-5F illustrate an app generator configured to edit a bespoke application in conjunction with a generative response engine in accordance with some aspects of the disclosure.

Figure 5A:
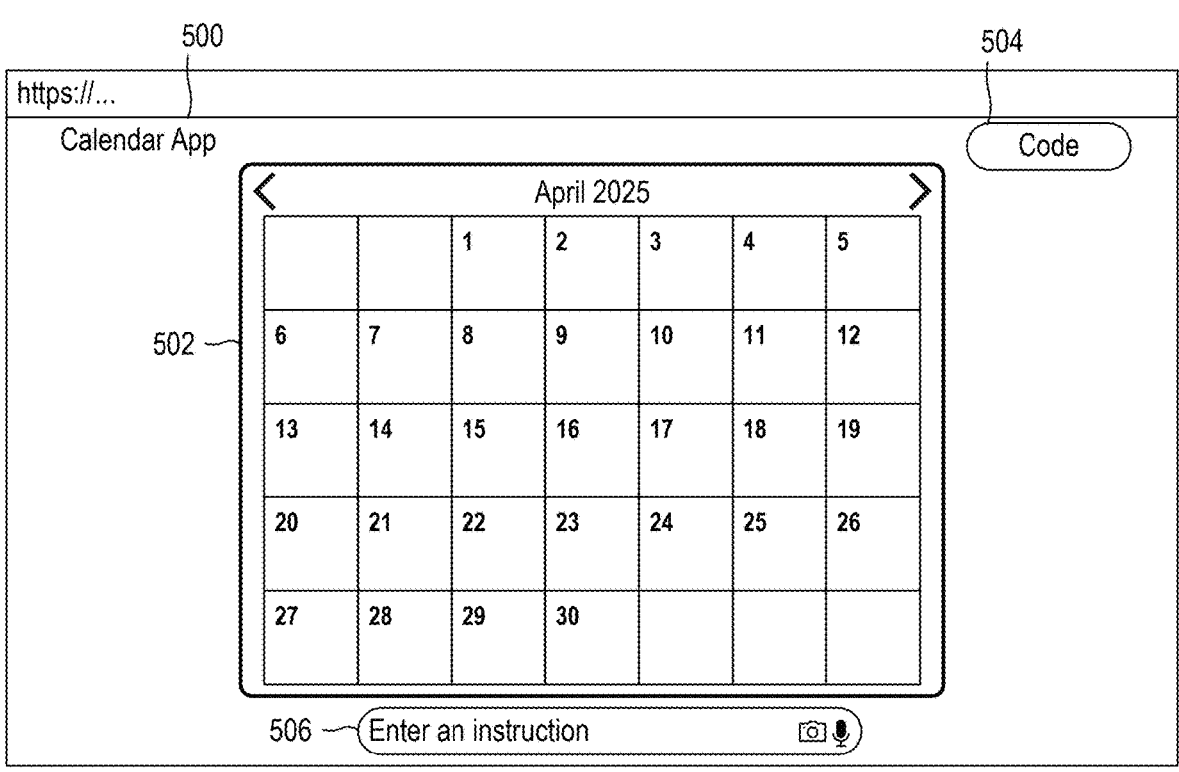

FIG. 5A illustrates app generator 500 editing and previewing a bespoke application 502 in accordance with some aspects of the disclosure. App generator 500 in FIG. 5A includes a live preview of bespoke application 502 and includes various options, such as button 504 to switch to a code view. In a live preview in FIG. 5B, bespoke application 502 is interactive and a user can modify state associated with bespoke application 502. FIG. 5A also illustrates an input component 506 that is configured to receive natural language input (e.g., content associated with person-to-person communications, etc.) and apply changes to bespoke application 502. For example, input component 506 can be configured to receive multimodal input such as text, images, audio, to enable app generator 500 to modify bespoke application 502 in conjunction with a generative response engine.

Figure 5B:
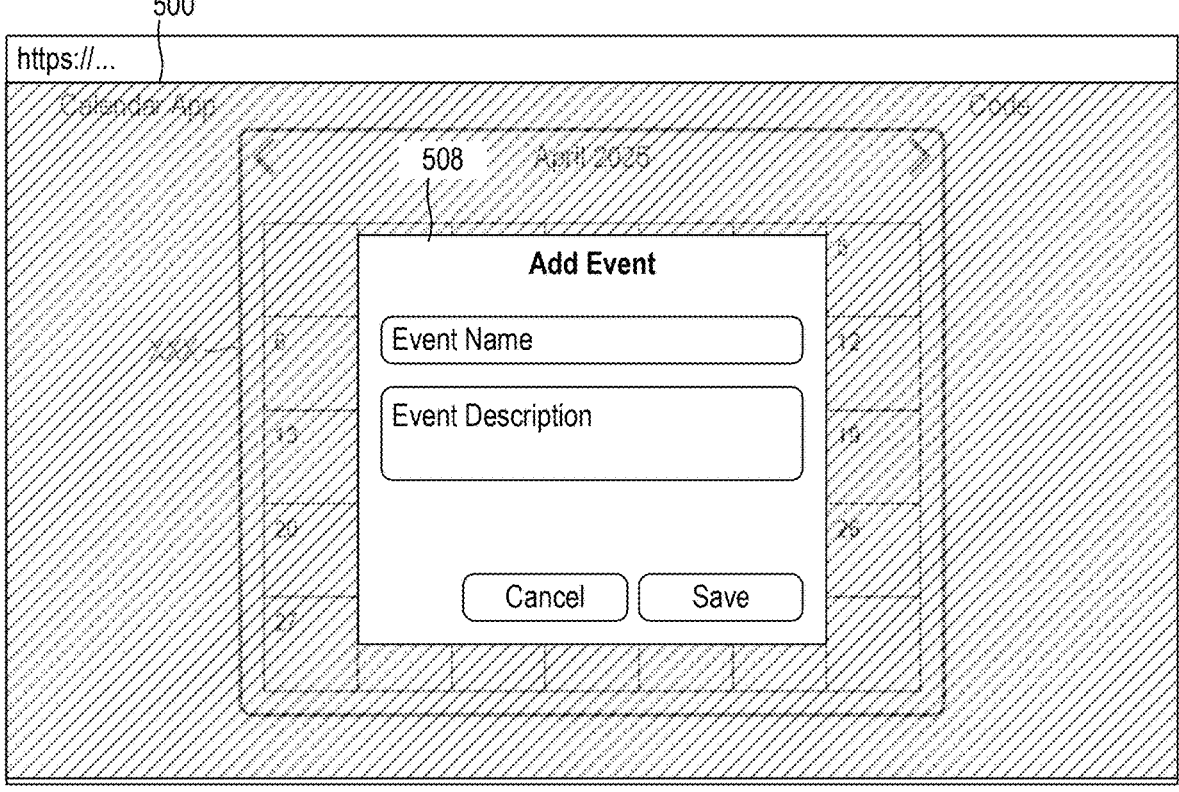

FIG. 5B illustrates an interaction of bespoke application 502 in accordance with some aspects of the disclosure. In particular, FIG. 5B shows that a user has invoked an option to add an event to a calendar of bespoke application 502 and shows real-time interaction at development time.

FIG. 5C illustrates an interaction associated with a bespoke component 510 that causes app generator 500 to render dynamic component 512 of app generator 500 to modify bespoke component 510. For example, a user may hover over a calendar container as demarcated by the dashed lines, and app generator 500 detects the hover and displays dynamic component 512. App generator 500 may also be configured to generate dynamic component 512 dynamically based on child content (e.g., anything within a child node of the calendar component) and surface relevant controls. Dynamic component 512 is dynamically positioned to be proximate to bespoke component 510. For example, because the calendar component is a container, dynamic component 512 may include font size control 514 and color control 516 and is placed within a border area of bespoke component 510. Dynamic component 512 also includes input control 518 for providing multimodal information to customize the functionality, styling, and settings of bespoke component 510.

Dynamic component 512 can display different contents based on the component features, such as the data that is displayed, the data provided into the component, the data that is provided to other child components, and so forth. For example, if an object (e.g., data) is passed through the bespoke component, options associated with this object may not be presented. Similarly, functions invoked by child components and functions invoked by the bespoke component can affect the display of dynamic component 512.

In some aspects, the input into dynamic component 512 is configured to apply the modification to the corresponding bespoke component 510. In this way, the user interface allows simple modification by rendering dynamic component 512 of app generator 500 within the same viewport area as bespoke application 502 naturally and intuitively.

FIG. 5D illustrates a code editing view of app generator 500 and shows various features of bespoke application 502. The code editing view can be invoked by app generator 500 by various commands such as button 504 in FIG. 5A. In this example, bespoke application 502 includes a client app and a server app to build a mixed rendering application (e.g., parts of the application are rendered at the server and parts of the application are rendered at the client). For example, FIG. 5D illustrates a split view displaying a server module (e.g., server.ts) and a base app component (e.g., App.tsx) that encapsulates all other components of bespoke application 502. The base app component is JSX format (e.g., .tsx indicate typescript-based JSX), which can mix JavaScript functions into a component render function (e.g., loops, conditions, etc.). For example, the base app component illustrates a protected route based on authentication detail (which are handled by the ProtectedRouter component).

FIG. 5E illustrates another example of app generator 500 that uses side area 520 (e.g., a nav bar, etc.) to allow a chat interface with a generative response engine to customize the bespoke application (in a main area 522). For example, FIG. 5E illustrates a first command 524 that is provided by a user to cause app generator 500 to scaffold a base application (e.g., copy templates, configurations with slight modification such as a name). In this example, the first command 524 includes a first feature to include (e.g., calendar) and the generative response engine identifies a component that is compatible with the base application. App generator 500 receives a response from the generative response engine and performs corresponding instructions (e.g., a github command line instruction to clone a repository, a command line instruction to install a package such as angular-calendar-scheduler, etc.). App generator 500 performs the various instructions, which can include adding code generated by the generative response engine, based on the installed packages to perform various functions. App generator 500 may also provide a response including various suggestions such as services to include, additional packages, and so forth that can be implemented using generative response engine.

FIG. 5F illustrates another example of app generator that is configured to control layout of the bespoke application. For example, app generator 500 installs a modal package and configures a modal to be displayed in connection with adding an event (e.g., to a calendar). The user may be able to customize aspects of the user interface using drag and drop events such as resizing a modal with a resize operation 530 to resize the modal from a first size 532 to a second size 534. In some aspects, child components may also perform a corresponding layout change, such as increasing a size of the button. Other reflow can happen such media queries, and other layout effects. App generator 500 can perform this modification by manually generating style information, which can be inserted into a CSS module or into the code itself. In another example, app generator 500 includes a style library (e.g., Tailwind CSS) and may modify the appearance based on composing classes of the style library (e.g., sequentially listed such as "flex-4 m-16 vw-70" to create a flex 4 column with a 16 pixel margin having a width of 70% of the viewport). In some aspects, the sidebar illustrated in FIG. 5F illustrates that the generative response engine can be engaged with other tasks, to assist the user functions that have a wider scope, whereas inputs within the main area may be limited to the scope of the bespoke application.

Figure 6A:
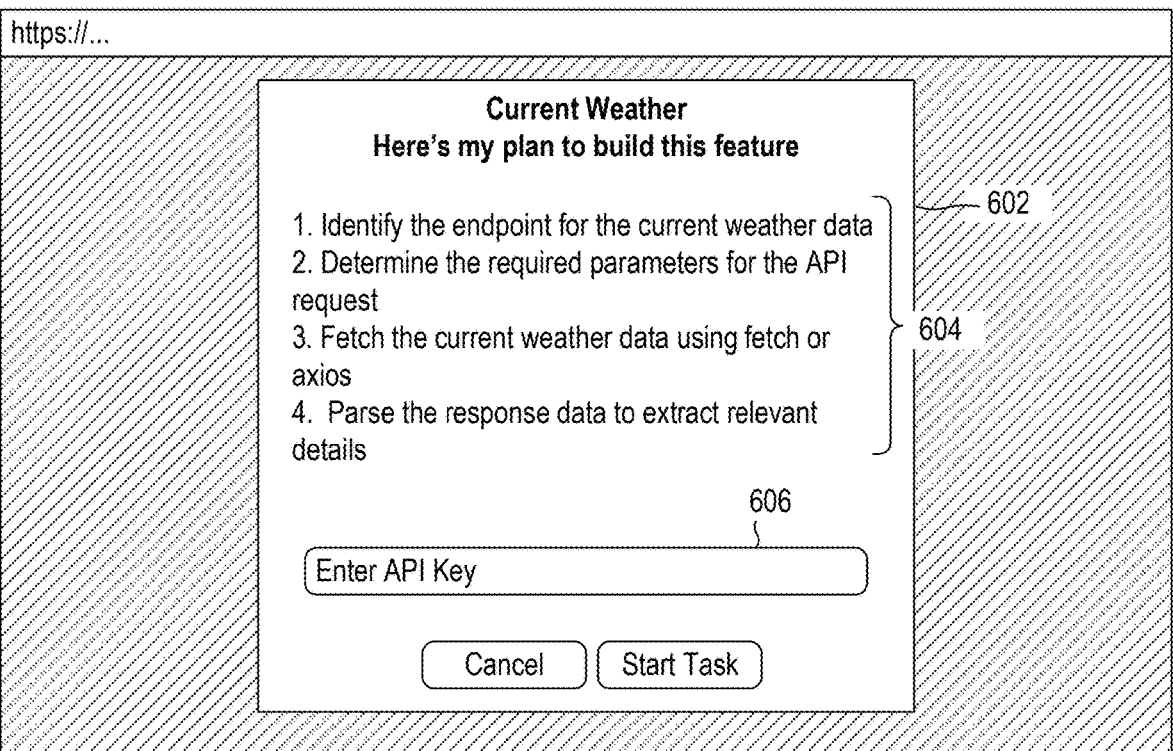
FIGS. 6A-6C illustrate a long task of an app generator configured to edit a bespoke application in conjunction with a generative response engine in accordance with some aspects of the disclosure.
Figure 6B:
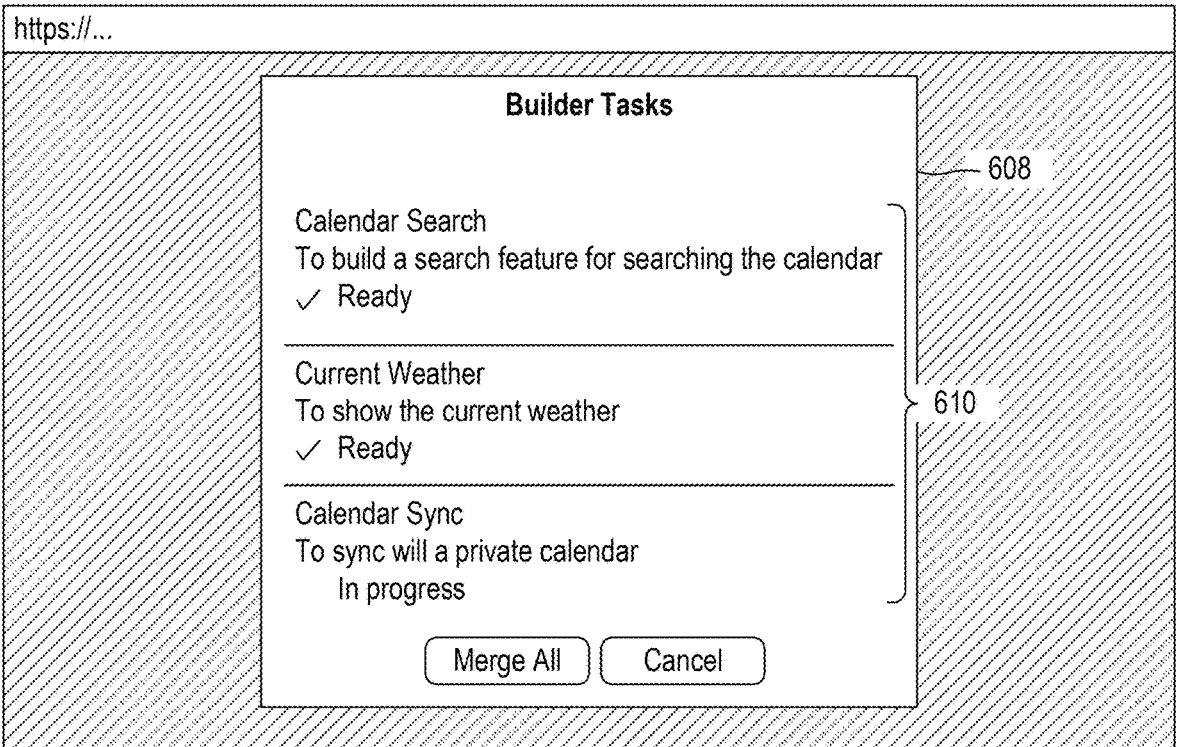
Figure 6C:
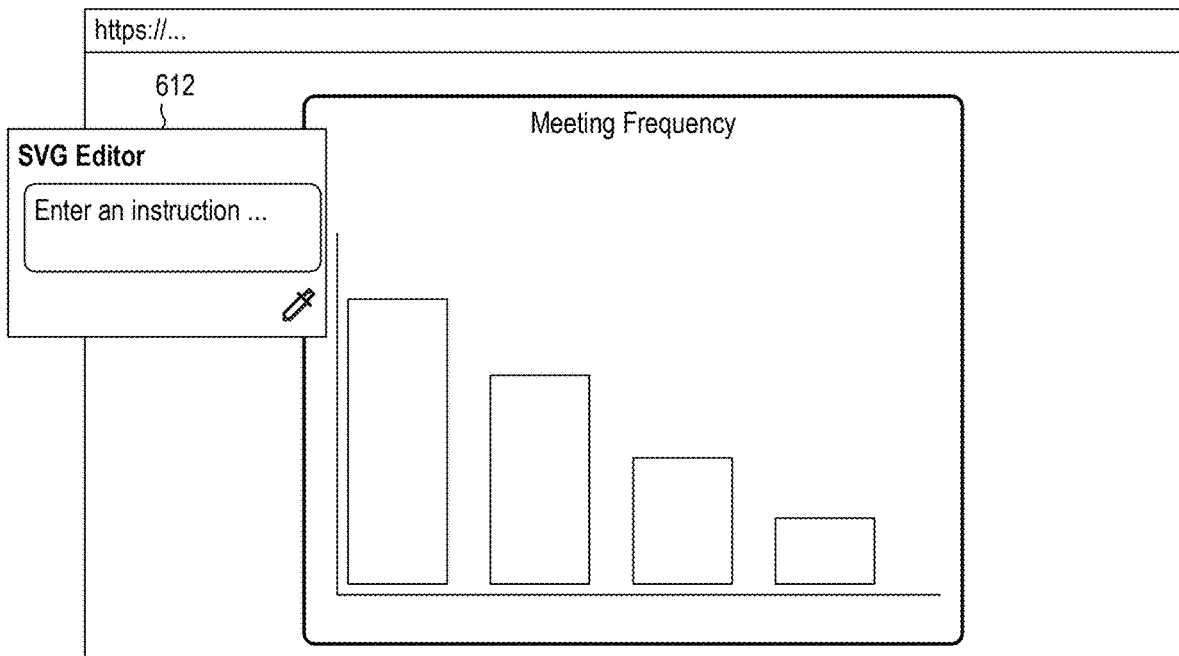

FIGS. 6A-6C illustrate a long task of an app generator configured to edit a bespoke application in conjunction with a generative response engine in accordance with some aspects of the disclosure.

FIG. 6A illustrates modal 602 that is displayed based on an input that the generative response engine deems to be a long task. In some aspects, a long task can be invoked via various techniques such as via an input component (e.g., input component 506) or a dynamic component (e.g., dynamic component 512). In general, the dynamic component is configured to apply modification to a specific component (e.g., via a hover or other input event). In response to input that corresponds to the long task, generative response engine generates plan 604 to display within modal 602. The generative response engine and/or the app generator may also request an API key via text input control 606. The app generator will use the API key to configure various settings to enable rich features to be instrumented.

FIG. 6B illustrates a modal 608 that can be invoked to illustrate various patches 610 associated with long tasks or short tasks that allow a user to merge and unmerge into the bespoke application.

FIG. 6C illustrates another example of the app generator modifying structured content such as XML (e.g., an SVG). Similar to a bespoke application, the app generator may be configured to generate dynamic component 612 to edit nodes of the SVG in a similar fashion. This example can be extended to other use cases, such as OpenXML, other types of applications that use XML (e.g., other frameworks such as XML application markup language (XAML), and so forth.

FIG. 7A is a flow diagram of a process 700 for generating a bespoke application in accordance with some aspects of the disclosure. The process 700 can be performed by a computing device (or apparatus) or a component (e.g., one or more chipsets, a system-on-chip (SoC), one or more processors such as one or more central processing units (CPUs), graphics processing units (GPUs), digital signal processors (DSPs), neural processing units (NPUs), neural signal processors (NSPs), microcontrollers, ASICs, FPGAs, programmable logic devices, discrete gates or transistor logic components, discrete hardware components, etc., an ML system such as a neural network model, any combination thereof, and/or other component or system) of the computing device. The operations of process 700 may be implemented as software components that are executed and run on one or more processors (e.g., CPU, GPU, DSP, NPU or neural engine, SoC, processor 1004 of FIG. 10, and/or other processor(s)). In some aspects, a computing device may connect to a cloud computing service including a generative response engine (e.g., generative response engine 210 in FIG. 2) to execute various tasks.

In some aspects, the computing device is configured to execute and display an app generator (e.g., app generator 202), which is an application configured to build other applications. For example, the app generator may be a React application configured to instrument and build other types of applications, which can use similar technology or different technology. For example, app generator 202 can also include a sandbox environment for compiled code (e.g., Rust, etc.) or bytecode.

In some aspects, the computing device may be configured to scaffold a bespoke application based on user input into the generator. For example, the app generator can include a list of standard templates to scaffold in. The app generator includes at least instructions to render the application at a root node in a DOM. For example, scaffolding comprises copying boilerplate content and making simple edits such as modifying a name, modifying configuration data based on a name, etc. In an online IDE, the scaffolding also includes installing remote packages (e.g., from NPM) and beginning the execution of the bespoke application. In some aspects, the app generator may also be configured to prompt a generative response engine to generate the scaffolded content dynamically with specific requirements (e.g., including specific libraries and styling features).

At block 702, the computing device may display the bespoke application at a substitute node. For example, the app generator may include a specific node that provides an entry point for features of the app generator, such as a dynamic component for modifying features of the bespoke component.

At block 704, the computing device may display a first component for editing the bespoke application. In one aspect, the first component is rendered in a fixed position that does overlap with the bespoke application. For example, the first component may be an input control below the bespoke application and is not expressly associated with any node of the bespoke application. The first component is associated with the app generator and is not included in the bespoke application, but as further described herein, can be rendered over elements of the bespoke application.

In another aspect, the first component is expressly associated with a target node of the bespoke application. For example, when a hover is detected by the app generator over the child component of the bespoke application, the app generator may display the first component based on the hover over the child component. Other types of input include touch events, click events, drag events, focus/blur events, keyboard events, and so forth. In this case, the first component may include a text input control (or a multimodal input control) for providing a natural language request to modify the node. In another example, the first component can also include a style control for modifying a child component of the bespoke application. The first component can also include a text description associated with a function of the child component. In this aspect, the first component is expressly associated with a child component of the bespoke application.

In some aspects, the child components of the bespoke application are interactive with the bespoke application based on code of in the child components (e.g., an onClick handler for a button). For example, the buttons displayed in the calendar application in FIG. 5B can be clicked to interact with the bespoke application. The child components are also interactive with the app generator based on the unique identifier. For example, a drag event such as resizing the modal in FIG. 5F allows the user to resize a modal and app generator 500 may perform the corresponding modifications to the bespoke component. In one example, app generator 500 is configured to generate style information corresponding to CSS that represents the change. In another example, app generator is configured to compose styles associated with a CSS library that represents the modification.

At block 706, the computing device may provide, based on input into the first component, a natural language request to a generative response engine. For example, the natural language request includes instructions to modify the bespoke application. The modifications can be purely cosmetic (e.g., "make this a dark component"), be purely functional (e.g., "disable this component unless a date of another component is before a specific date"), or can be a combination of appearance and function ("make this date input component for selecting a single date into a date range input component for selecting a range of dates").

At block 708, the computing device may obtain, from the generative response engine, a first patch associated with the user input, the first patch comprising instructions corresponding to the natural language request. The patch includes updated instructions associated with a module (e.g., components are converted into modules), a dependency graph, and an identifier associated with the module. In one example, the module comprises one of a function, a class, or a component. The module can also include JSX, which is a combination of functions, data, and markup elements to dynamically render content. JSX can also be considered a function (e.g., a render( ) function). In some cases, the first patch includes a change to a property of an object having data rendered in the DOM. For example, a type may need to be updated to add or edit properties. For example, when a date component is changed, the component uses an array of primitive values such as an array or at least two dates, timestamps, or strings.

At block 710, the computing device may modify the bespoke application to include the first patch. For example, the app generator can include a patch management engine (e.g., the patch management engine 209) to allow merging, unmerging, rebasing, and other corresponding operations to implement code in any particular order.

In some aspects, the computing device may, after modifying the bespoke application to include the first patch, render at least one component of the bespoke application modified based on the first patch. In some aspects, a state of the at least one component is maintained. For example, when a type (e.g., an object definition such as {id: string, name: string}) is changed, the app generator is configured to persist the current state. For example, the user may have entered data to test particular features, and that data will persist even in the event the type changes and current data is unaffected by the type changes.

In some aspects, the computing device, may be configured to obtain, from the generative response engine, a plan associated with a feature to incorporate into the bespoke application. For example, the input into the first component may be a request to implement a feature that includes multiple discrete steps (e.g., add external calendar sync, add weather, add a rich text component, etc.). The generative response engine is configured to generate a plan that includes a plurality of tasks to implement the feature and sends the plan to the computing device for approval and/or modification. For example, the computing device may display a user interface (e.g., a modal in FIG. 6A) including the plurality of tasks for approval. In some aspects, the modal can include an input component for receiving a parameter associated with an external source (e.g., an API key) corresponding to the feature. Other non-limiting parameters include a URL associated with a resource (e.g., an S3 bucket), authentication credentials, time zone, etc.

The computing device may then receive at least one patch corresponding to the feature and modify the bespoke application to include the at least one patch.

In some aspects, the plan may be requested before the first patch is provided to the computing device, but the first patch is applied before the generative response engine has finished generating the at least one patch. For example, the first patch is received while the generative response engine is performing the plurality of tasks. In some aspects, the patch management features of the app generator can configure the bespoke application to include the at least one patch even after the first patch is applied. A dependency graph included in the patches identifies relationships and can ensure that the code can be successfully merged. Conflicting code can occur, and the patch management engine can display a merge modal to facilitate the differences if the conflict cannot be resolved autonomously.

In another aspect, the computing device may receive an image from a user. The computing device may send at least the image to the generative response engine. The generative response engine can then identify the corresponding features of the bespoke application and the image and generate a second patch to modify the bespoke application to appear similar to the image. In some aspects, the second patch may only include styling information (e.g., CSS). In other aspects, the second patch can include information pertaining to specific styling features associated with a framework (e.g., a theme that is provided to a component that maps properties to different attributes). In some aspects, the style information may include predefined classes that are associated with a style library (e.g., TailwindCSS) that are applied to a headless component (e.g., shadcn/ui), which is a component that has no additional styling and is combined with a style library). In other aspects, the style information includes individual styles to apply to a headed library (e.g., material UI).

In some aspects, the generative response engine is configured to obtain patches based on various user inputs to modify a configuration file. For example, a persistent challenge is the complexity and constant changes to the multiple configuration files such as tsconfig.json, package.json, vite.config.json, environment variables, etc. The package.json configuration for example includes server features such as launching servers, injecting linting features, and so forth. The vite configuration implement development features and servers and can enable servers and other advanced features. The generative response engine can be configured to modify these configurations based on user input requests.

FIG. 7B is a flow diagram of a process 720 for generating a bespoke application in accordance with some aspects of the disclosure. The process 720 may be performed by a computing device similar to the process 700.

At block 722, At block 722, the computing device receives, by a front end to a generative response engine, a first prompt to generate a bespoke application. The front end includes a prompt interface (e.g., a sidebar) and a main area where the bespoke application is rendered (e.g., via a substitute node).

The first input comprises a natural language instruction identifying at least one feature to add to the user interface.

At block 724, responsive to the first prompt, the computing device obtains code for the bespoke application. The code includes subsets that correspond to at least one feature within the first prompt.

The computing device may also configure information in the bespoke information for runtime operations in connection with the front end. In one aspect, the computing device may provide each component associated with the bespoke application with a unique identifier. In some cases, each HTML node in a component may be provided with a unique identifier. The computing device may also add various types of event handlers (drag events, mouse events, touch events, etc.) that allow the unique identifier to be provided to the front end to add additional features, such as a popup to edit features graphically and/or with the generative response engine.

At block 726, the computing device may execute the code for the bespoke application.

At block 728, the computing device may, based on the executing the code for the bespoke application, render a user interface of the bespoke application within the front end.

The computing device is further configured such that components of the bespoke application can be modified. Each component associated with the bespoke application is provided with a unique identifier. The unique identifiers are used in connection with event handlers to connect events to the front end, enabling the system to track and manage user interactions with specific components. In some aspects, the computing device is configured to modify the user interface of the bespoke application. Based on identification of an input event associated with a corresponding component, the computing device displays the prompt input proximate to the corresponding component. The computing device receives a first input into a component of the user interface to adjust a visual aspect of the component. The computing device generates a modification to the first code subset to correspond to the adjusted aspect of the user interface of the bespoke application.

At block 730, the computing device may receive a first input into a component of the user interface to adjust a visual aspect of the component.

At block 732, the computing device may generate a modification to a first code subset to correspond the visual aspect of the user interface of the bespoke application.

In some aspects, the computing device may receive a second prompt within the prompt input and, responsive to the second prompt, obtain revised code for a second code subset. The second prompt requests a modification to the bespoke application, such as by adding another feature or modifying an existing feature. In some cases, components are composable and can be converted into different uses with some assistance, particularly from a generative response engine. For example, if the second prompt requests modifying a date input component into a date range input component, the generative response engine can generate instructions based on this feature. The computing device may then render a portion of the bespoke application corresponding to the revised code (e.g. using hot module replacement).

In some aspects, the prompt input is associated with the front end and is not included in the bespoke application. For example, the prompt input is a sidebar that allows interaction with a generative response engine, such as requesting assistance, explaining code, or asking for assistance with features not related to the bespoke application.

In other cases, a popup prompt can be displayed by the front end. For example, a hovering over a bespoke component of the bespoken application can cause a mouse event to trigger the popup prompt (based on the unique identifier of the bespoke component) and allow a prompt to specifically target a bespoke component. In this manner, the front end can provide instructions to a generative response engine to an instruction to modify and a specific scope (e.g., just a specific component). In this case, the generative response engine does not infer the scope or the change due to the scope of the natural language request.

In some cases, a prompt may be associated with a short task that has a particular scope. In one aspect, the computing device may provide a prompt associated with modifying the corresponding component to the generative response engine. For example, when a popup is generated based on a mouse over event, the prompt is specifically associated with that component (e.g., the scope). The computing device may also send the corresponding component with the prompt. In some cases, the content sent with the component includes other content (e.g., the source code of the component, CSS modules, hooks, imports, etc.)

In some cases, a prompt may be associated with a long task that concurrently executes in a generative response engine while other features are added with short tasks. For example, the computing device may obtain, from the generative response engine, a plan associated with a feature to incorporate into the bespoke application. The plan includes a plurality of tasks to implement the feature into the bespoke application. The prompt may also include the component (e.g., the source code of the component including any additional content such as CSS modules, hooks, imports, etc.). As part of the long task, the computing device may display a modal that lists the plurality of tasks for approval. The computing device may then transmit the plan to the generative response engine for performing the tasks. The modal can also request necessary input, such as API keys, etc.

In some cases, tasks can be performed concurrently. For example, the first code subset is received from the generative response engine and modifies the bespoke application while the generative response engine is performing the plurality of tasks (e.g., associated with a long task). The computing device uses patches to merge new features and may be able to merge changes from the long task, even if a short task was started during and finished before the long task.

Figure 8:
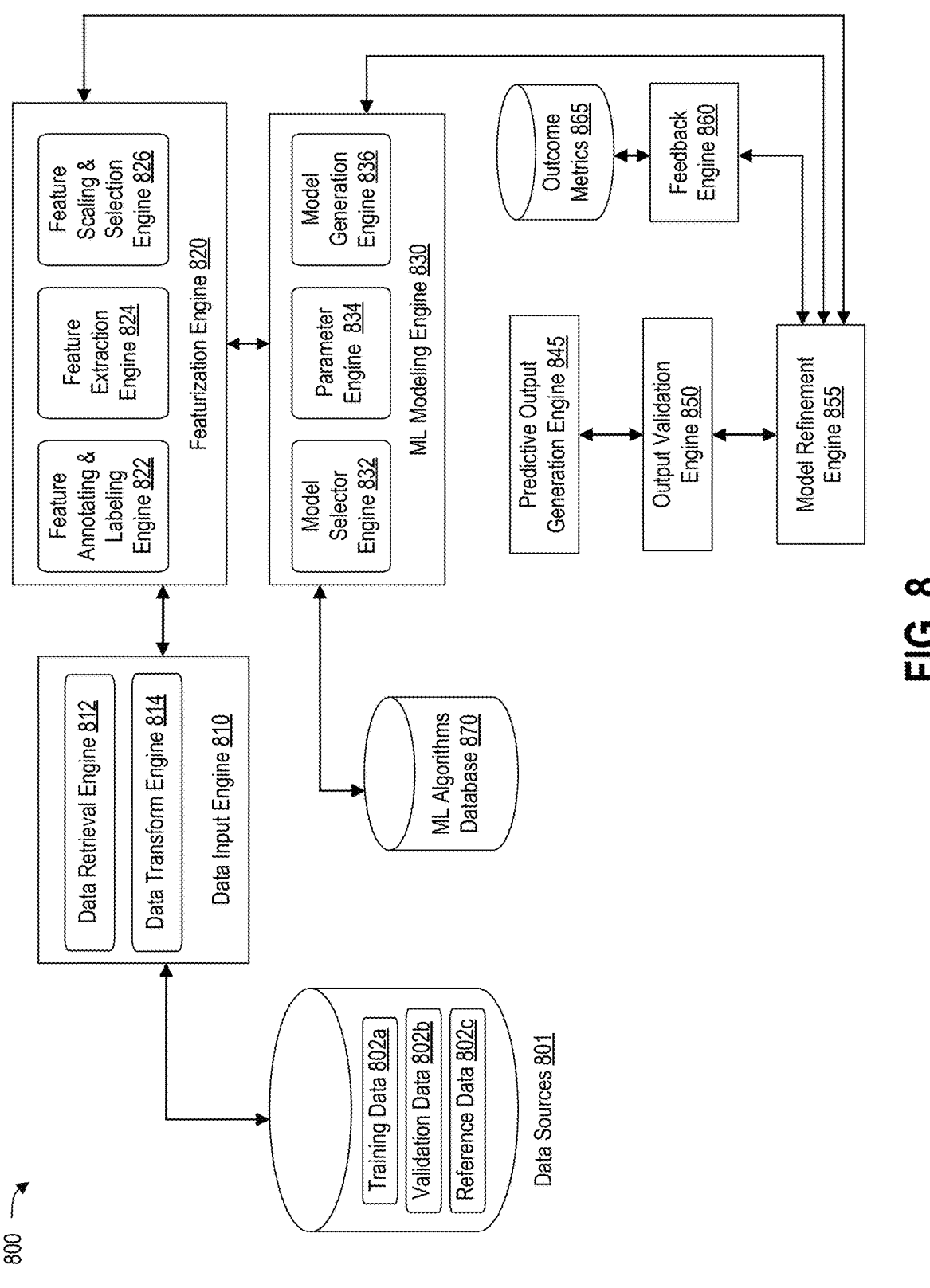
FIG. 8 is a block diagram illustrating an example machine learning platform for implementing various aspects of this disclosure in accordance with some aspects of the present disclosure.

FIG. 8 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 800 may include data input engine 810 that can further include data retrieval engine 812 and data transform engine 814. Data retrieval engine 812 may be configured to access, interpret, request, or receive data, which may be adjusted, reformatted, or changed (e.g., to be interpretable by another engine, such as data input engine 810). For example, data retrieval engine 812 may request data from a remote source using an API. Data input engine 810 may be configured to access, interpret, request, format, re-format, or receive input data from data sources(s) 801. For example, data input engine 810 may be configured to use data transform engine 814 to execute a re-configuration or other change to data, such as a data dimension reduction. In some aspects, data sources(s) 801 may be associated with a single entity (e.g., organization) or with multiple entities. Data sources(s) 801 may include one or more of training data 802*a* (e.g., input data to feed a machine learning model as part of one or more training processes), validation data 802*b* (e.g., data against which at least one processor may compare model output with, such as to determine model output quality), and/or reference data 802*c*. In some aspects, data input engine 810 can be implemented using at least one computing device. For example, data from data sources(s) 801 can be obtained through one or more I/O devices and/or network interfaces. Further, the data may be stored (e.g., during execution of one or more operations) in a suitable storage or system memory. Data input engine 810 may also be configured to interact with a data storage, which may be implemented on a computing device that stores data in storage or system memory.

System 800 may include featurization engine 820. Featurization engine 820 may include feature annotating & labeling engine 822 (e.g., configured to annotate or label features from a model or data, which may be extracted by feature extraction engine 824), feature extraction engine 824 (e.g., configured to extract one or more features from a model or data), and/or feature scaling & selection engine 826 Feature scaling & selection engine 826 may be configured to determine, select, limit, constrain, concatenate, or define features (e.g., AI features) for use with AI models.

System 800 may also include machine learning (ML) ML modeling engine 830, which may be configured to execute one or more operations on a machine learning model (e.g., model training, model re-configuration, model validation, model testing), such as those described in the processes described herein. For example, ML modeling engine 830 may execute an operation to train a machine learning model, such as adding, removing, or modifying a model parameter. Training of a machine learning model may be supervised, semi-supervised, or unsupervised. In some aspects, training of a machine learning model may include multiple epochs, or passes of data (e.g., training data 802*a*) through a machine learning model process (e.g., a training process). In some aspects, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed aspects in any way, a machine learning model may include millions, billions, or even trillions of model parameters. ML modeling engine 830 may include model selector engine 832 (e.g., configured to select a model from among a plurality of models, such as based on input data), parameter engine 834 (e.g., configured to add, remove, and/or change one or more parameters of a model), and/or model generation engine 836 (e.g., configured to generate one or more machine learning models, such as according to model input data, model output data, comparison data, and/or validation data).

In some aspects, model selector engine 832 may be configured to receive input and/or transmit output to ML algorithms database 870. Similarly, featurization engine 820 can utilize storage or system memory for storing data and can utilize one or more I/O devices or network interfaces for transmitting or receiving data. ML algorithms database 870 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 870 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 870 include versions DALL-E, CHAT GPT, and SORA, all provided by OPEN AI.

System 800 can further include predictive output generation engine 845 and output validation engine 850 (e.g., configured to apply validation data to machine learning model output). Predictive output generation engine 845 can analyze the input and identify relevant patterns and associations in the data it has learned to generate a sequence of words that predictive output generation engine 845 predicts is the most likely continuation of the input using one or more models from the ML algorithms database 870, aiming to provide a coherent and contextually relevant answer. Predictive output generation engine 845 generates responses by sampling from the probability distribution of possible words and sequences, guided by the patterns observed during its training. In some aspects, predictive output generation engine 845 can generate multiple possible responses before presenting the final one. Predictive output generation engine 845 can generate multiple responses based on the input, and these responses are variations that predictive output generation engine 845 considers potentially relevant and coherent. Output validation engine 850 can evaluate these generated responses based on certain criteria. These criteria can include relevance to the prompt, coherence, fluency, and sometimes adherence to specific guidelines or rules, depending on the application. Based on this evaluation, output validation engine 850 selects the most appropriate response. This selection is typically the one that scores highest on the set criteria, balancing factors like relevance, informativeness, and coherence.

System 800 can further include feedback engine 860 (e.g., configured to apply feedback from a user and/or machine to a model) and model refinement engine 855 (e.g., configured to update or re-configure a model). In some aspects, feedback engine 860 may receive input and/or transmit output (e.g., output from a trained, partially trained, or untrained model) to outcome metrics database 865. Outcome metrics database 865 may be configured to store output from one or more models and may also be configured to associate output with one or more models. In some aspects, outcome metrics database 865, or other device (e.g., model refinement engine 855 or feedback engine 860), may be configured to correlate output, detect trends in output data, and/or infer a change to input or model parameters to cause a particular model output or type of model output. In some aspects, model refinement engine 855 may receive output from predictive output generation engine 845 or output validation engine 850. In some aspects, model refinement engine 855 may transmit the received output to featurization engine 820 or ML modeling engine 830 in one or more iterative cycles.

The engines of system 800 may be packaged functional hardware units designed for use with other components or a part of a program that performs a particular function (e.g., of related functions). Any or each of these modules may be implemented using a computing device. In some aspects, the functionality of system 800 may be split across multiple computing devices to allow for distributed processing of the data, which may improve output speed and reduce computational load on individual devices. In some aspects, system 800 may use load-balancing to maintain stable resource load (e.g., processing load, memory load, or bandwidth load) across multiple computing devices and to reduce the risk of a computing device or connection becoming overloaded. In these or other aspects, the different components may communicate over one or more I/O devices and/or network interfaces.

System 800 can be related to different domains or fields of use. Descriptions of aspects related to specific domains, such as natural language processing or language modeling, is not intended to limit the disclosed aspects to those specific domains, and aspects consistent with the present disclosure can apply to any domain that utilizes predictive modeling based on available data.

Figure 9A:
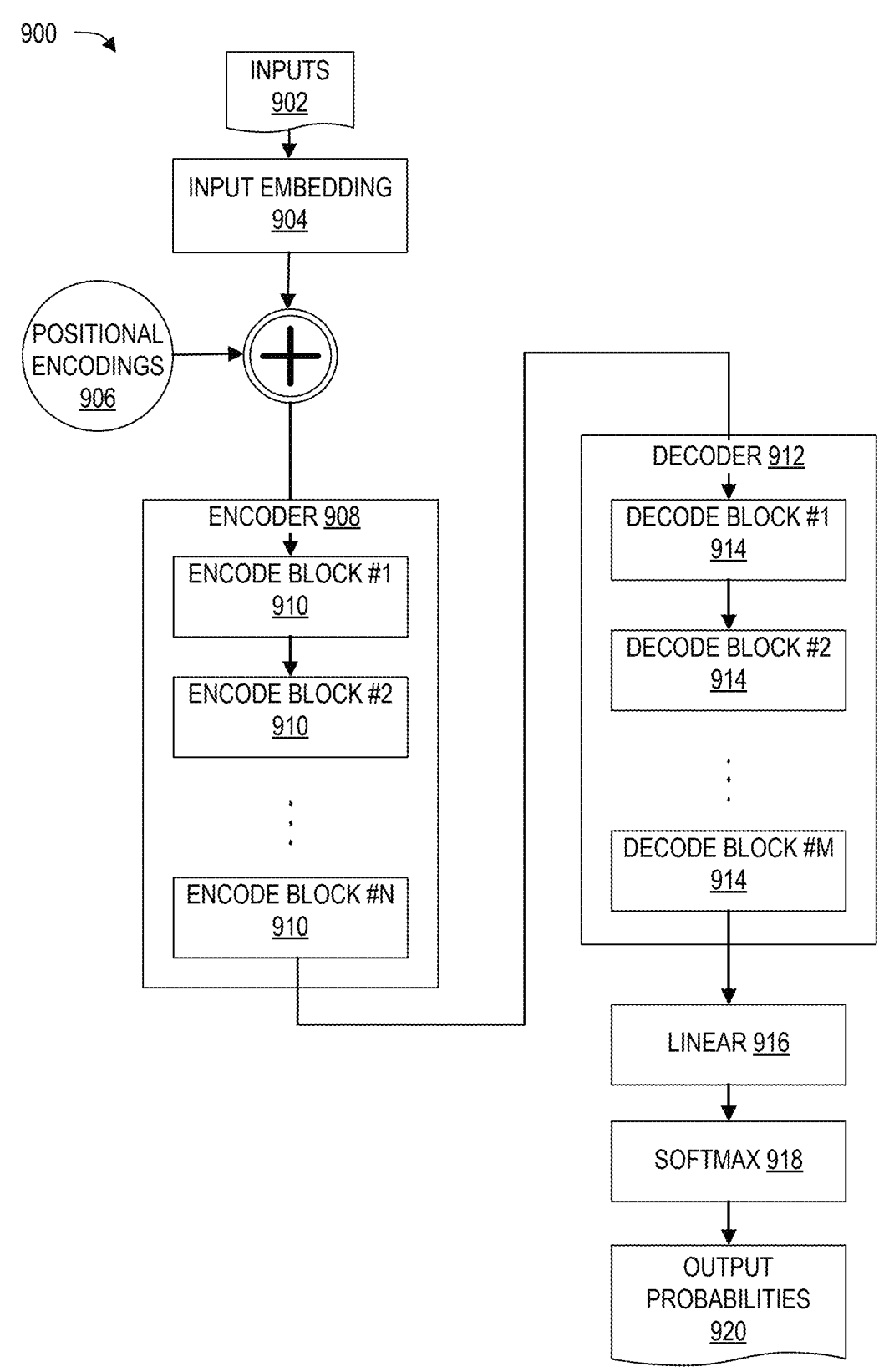
FIG. 9A, FIG. 9B, and FIG. 9C illustrates an example transformer architecture in accordance with some aspects of the present disclosure.
Figure 9B:
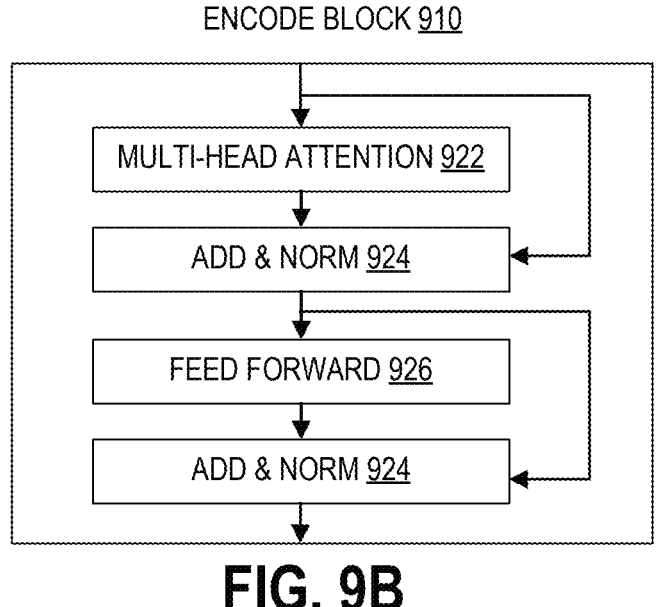
Figure 9C:
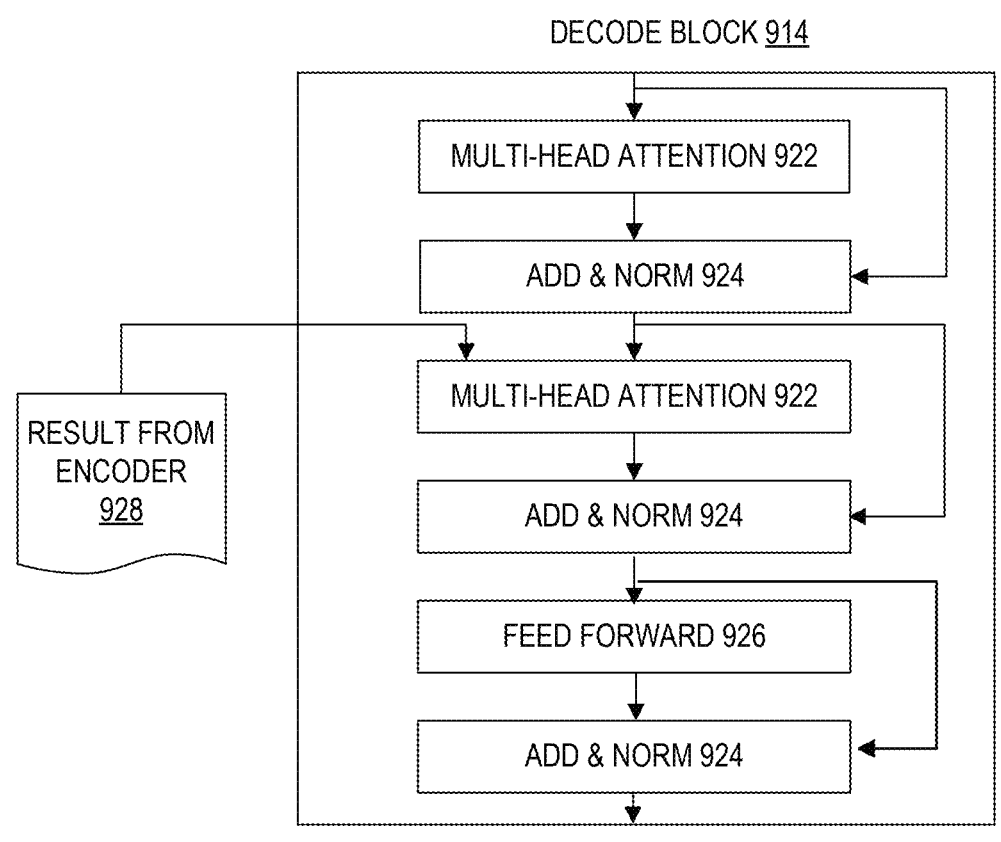

FIG. 9A, FIG. 9B, and FIG. 9C illustrates an example transformer architecture in accordance with some aspects of the present technology. Examples of ML models that use a transformer neural network (e.g., transformer architecture 900) can include, e.g., generative pretrained transformer (GPT) models and Bidirectional Encoder Representations from Transformer (BERT) models. The transformer architecture 900, which is illustrated in FIG. 9A, FIG. 9B, and FIG. 9C, includes inputs 902, input embedding block 904, positional encodings 906, encoder 908 including encode blocks 910, decoder 912 including decode blocks 914, linear block 916, softmax block 918, and output probabilities 920.

Input embedding block 904 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 904 can be learned embeddings to convert the input tokens and output tokens to vectors of dimension that have the same dimension as the positional encodings, for example.

Positional encodings 906 provide information about the relative or absolute position of the tokens in the sequence. According to certain non-limiting examples, positional encodings 906 can be provided by adding positional encodings to the input embeddings at the inputs to the encoder 908 and decoder 912. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 908 can use stacked self-attention and point-wise, fully connected layers. Encoder 908 can be a stack of N identical layers (e.g., N=6), and each layer can be an encode block, as illustrated by encode block 910 shown in FIG. 9B. Each encode block 910 has two sub-layers: (i) a first sub-layer has a multi-head attention block 922 and (ii) a second sub-layer has a feed forward block 926, which can be a position-wise fully connected feed-forward network. The feed forward block 926 can use a rectified linear unit (ReLU).

Encoder 908 uses a residual connection around each of the two sub-layers, followed by an add & norm block 924, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 908, decoder 912 uses stacked self-attention and point-wise, fully connected layers. Decoder 912 can also be a stack of M identical layers (e.g., M=6), and each layer can be a decode block, as illustrated by decoder 912 shown in FIG. 9B. In addition to the two sub-layers (i.e., the sublayer with multi-head attention block 922 and the sub-layer with feed forward block 926) found in encode block 910, decode block 914 can include a third sub-layer, which performs multi-head attention over the output of the encoder stack. Similar to encoder 908, decoder 912 uses residual connections around each of the sub-layers, followed by layer normalization. Additionally, the sub-layer with multi-head attention block 922 can be modified in the decoder stack to prevent positions from attending to subsequent positions. This masking, combined with the fact that the output embeddings are offset by one position, can ensure that the predictions for position i can depend on the known output data at positions less than i.

Linear block 916 can be a learned linear transformation. For example, when transformer architecture 900 is being used to translate from a first language into a second language, linear block 916 can project the output from the last decode softmax block 918 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 918 then turns the scores from linear block 916 into output probabilities 920 (which add up to 1.0). In each position, the index provides for the word with the highest probability, and then maps that index to the corresponding word in the vocabulary. Those words then form the output sequence of transformer architecture 900. The softmax operation is applied to the output from linear block 916 to convert the raw numbers into output probabilities 920 (e.g., token probabilities).

Figure 10:
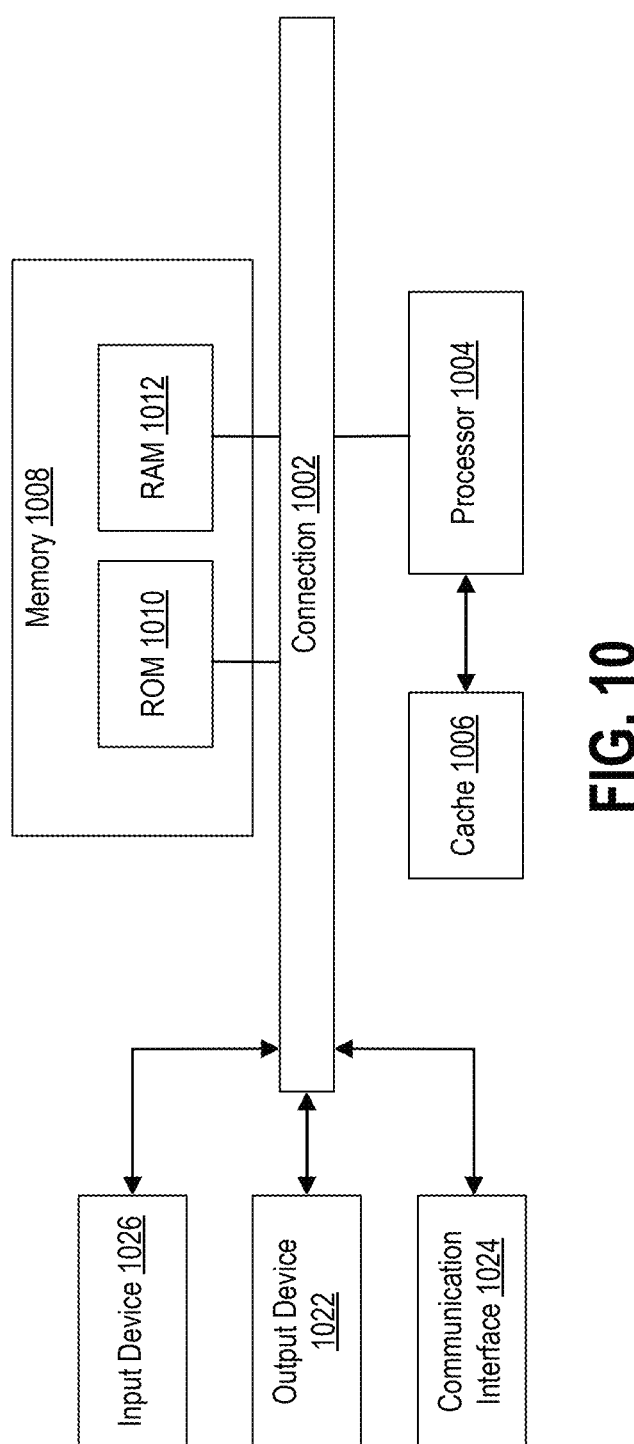
FIG. 10 shows an example of a computing system that can implement various aspects of the present disclosure and any engine illustrated in FIG. 1 or any component thereof.

FIG. 10 shows an example of computing system 1000, which can be, For example, any computing device making up any engine illustrated in FIG. 1 or any component thereof.

In some aspects, computing system 1000 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 1000 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 1000 includes at least one processing unit (CPU or processor) 1004 and connection 1002 that couples various system components including system memory 1008, such as read-only memory (ROM)

1010 and random access memory (RAM) 1012 to processor 1004. Memory 1008 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 1008 can include software services, servers, logic, etc., that when the code that defines such software is executed by the processor 1004, it causes the system to perform a function. In some aspects, a hardware service that performs a particular function can include the software component stored in a computer-readable medium in connection with the necessary hardware components, such as processor 1004, connection 1002, output device 1022, etc., to carry out the function.

Computing system 1000 can include a cache of high-speed memory 1006 connected directly with, in close proximity to, or integrated as part of processor 1004.

Connection 1002 can be a physical connection via a bus, or a direct connection into processor 1004, such as in a chipset architecture. Connection 1002 can also be a virtual connection, networked connection, or logical connection.

Processor 1004 can include any general purpose processor and a hardware service or software service stored in memory 1008, configured to control processor 1004 as well as a special-purpose processor where software instructions are incorporated into the actual processor design. Processor 1004 may be a completely self-contained computing system, containing multiple cores or processors, a bus, memory controller, cache, etc. A multi-core processor may be symmetric or asymmetric. Processor 1004 can be physical or virtual.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

In some aspects, computing system 1000 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.
Aspects:

The present technology includes computer-readable storage mediums for storing instructions, and systems for executing any one of the methods embodied in the instructions addressed in the aspects of the present technology presented below:

Aspect 1. A method comprising: receiving, by a front end to a generative response engine, a first prompt to generate a bespoke application, wherein the front end includes a prompt input and a main content area, obtaining code for the bespoke application, wherein the code includes subsets that correspond to at least one feature within the first prompt; executing the code for the bespoke application; based on the executing the code for the bespoke application, rendering a user interface of the bespoke application within the main content area of the front end; receiving a first input into a component of the user interface to adjust a visual aspect of the component; generating a modification to a first code subset to correspond the visual aspect of the user interface of the bespoke application.

Aspect 2. The method of Aspect 1, further comprising: receiving a second prompt within the prompt input, wherein the second prompt requests a modification to the bespoke application; responsive to the second prompt, obtaining revised code for a second code subset; rendering a portion of the bespoke application corresponding to the revised code.

Aspect 3. The method of any of Aspects 1 to 2, wherein the first input comprises a natural language instruction identifying the at least one feature to add to the user interface.

Aspect 4. The method of any of Aspects 1 to 3, further comprising: providing each component associated with the bespoke application with a unique identifier; and based on identification of an input event associated with a corresponding component, displaying the prompt input proximate to the corresponding component.

Aspect 5. The method of Aspect 4, wherein the prompt input is associated with the front end and is not included in the bespoke application.

Aspect 6. The method of any of Aspects 4 to 5, further comprising: providing a prompt associated with modifying the corresponding component to the generative response engine, wherein the prompt includes the corresponding component.

Aspect 7. The method of any of Aspects 1 to 6, further comprising: obtaining, from the generative response engine, a plan associated with a feature to incorporate into the bespoke application, wherein the plan includes a plurality of tasks to implement the feature into the bespoke application; displaying a modal including the plurality of tasks for approval.

Aspect 8. The method of Aspect 7, wherein the modal includes an input component for receiving a parameter associated with an external source corresponding to the feature.

Aspect 9. The method of Aspect 8, wherein the parameter includes a key for accessing the external source.

Aspect 10. The method of any of Aspects 7 to 9, wherein the first code subset is received from the generative response engine and modifies the bespoke application while the generative response engine is performing the plurality of tasks.

Aspect 11. A computing device including at least one memory and at least one processor coupled to the at least one memory and configured to: receiving, by a front end to a generative response engine, a first prompt to generate a bespoke application, wherein the front end includes a prompt input and a main content, obtain code for the bespoke application, wherein the code includes subsets that correspond to at least one feature within the first prompt; execute the code for the bespoke application; based on the executing the code for the bespoke application, render a user interface of the bespoke application within the main content area of the front end; receive a first input into a component of the user interface to adjust a visual aspect of the component; and generate a modification to a first code subset to correspond the visual aspect of the user interface of the bespoke application.

Aspect 12. The computing device of Aspect 11, wherein the at least one processor is configured to: receive a second prompt within the prompt input, wherein the second prompt requests a modification to the bespoke application; responsive to the second prompt, obtain revised code for a second code subset; and render a portion of the bespoke application corresponding to the revised code.

Aspect 13. The computing device of any of Aspects 11 to 12, wherein the first input comprises a natural language instruction identifying the at least one feature to add to the user interface.

Aspect 14. The computing device of any of Aspects 11 to 13, wherein the at least one processor is configured to: provide each component associated with the bespoke application with a unique identifier; and based on identification of an input event associated with a corresponding component, display the prompt input proximate to the corresponding component.

Aspect 15. The computing device of Aspect 14, wherein the at least one processor is configured to: wherein the prompt input is associated with the front end and is not included in the bespoke application.

Aspect 16. The computing device of any of Aspects 14 to 15, wherein the at least one processor is configured to: provide a prompt associated with modifying the corresponding component to the generative response engine, wherein the prompt includes the corresponding component.

Aspect 17. The computing device of any of Aspects 11 to 16, wherein the at least one processor is configured to: obtaining, from the generative response engine, a plan associated with a feature to incorporate into the bespoke application, wherein the plan includes a plurality of tasks to implement the feature into the bespoke application; display a modal including the plurality of tasks for approval.

Aspect 18. The computing device of Aspect 17, wherein the modal includes an input component for receiving a parameter associated with an external source corresponding to the feature.

Aspect 19. The computing device of Aspect 18, wherein the parameter includes a key for accessing the external source.

Aspect 20. The computing device of any of Aspects 17 to 19, wherein the first code subset is received from the generative response engine and modifies the bespoke application while the generative response engine is performing the plurality of tasks.

Aspect 21. A method of building an application within a document object model (DOM), comprising: displaying a first component for editing a bespoke application; providing, based on input into the first component, a natural language request to a generative response engine, wherein the natural language request includes instructions to modify the bespoke application; obtaining, from the generative response engine, a first patch associated with the input, the first patch comprising instructions corresponding to the natural language request; modifying the bespoke application to include the first patch.

Aspect 22. The method of Aspect 21, further comprising: after modifying the bespoke application to include the first patch, rendering at least one component of the bespoke application modified based on the first patch, wherein a state of the at least one component is maintained.

Aspect 23. The method of any of Aspects 21 to 22, wherein the first patch comprises updated instructions associated with a module, a dependency graph, and an identifier associated with the module, wherein the module comprises one of a function, a class, or a component.

Aspect 24. The method of any of Aspects 21 to 23, wherein the first patch includes a change to a property of an object having data rendered in the DOM.

Aspect 25. The method of any of Aspects 21 to 24, wherein the first component comprises a text input component that is expressly associated with a child component of the bespoke application.

Aspect 26. The method of any of Aspects 21 to 25, wherein the first component comprises at least a text input control and a style control for modifying a child component of the bespoke application.

Aspect 27. The method of Aspect 26, wherein the first patch is configured to apply to functional or style changes to the child component based on the input into the first component.

Aspect 28. The method of any of Aspects 26 to 27, wherein the first component is displayed based on hovering a cursor or a touch input associated with the child component.

Aspect 29. The method of any of Aspects 26 to 28, wherein the first component includes a text description associated with a function of the child component.

Aspect 30. The method of any of Aspects 21 to 29, further comprising: obtaining, from the generative response engine, a plan associated with a feature to incorporate into the bespoke application, wherein the plan includes a plurality of tasks to implement the feature into the bespoke application; displaying a user interface including the plurality of tasks for approval.

Aspect 31. The method of Aspect 30, wherein the user interface includes an input component for receiving a parameter associated with an external source corresponding to the feature.

Aspect 32. The method of Aspect 31, wherein the parameter includes a key for accessing the external source.

Aspect 33. The method of any of Aspects 30 to 32, wherein the first patch is received from the generative response engine and modifies the bespoke application while the generative response engine is performing the plurality of tasks.

Aspect 34. The method of any of Aspects 30 to 33, further comprising: receiving at least one patch corresponding to the feature; and modifying the bespoke application to include the at least one patch.

Aspect 35. The method of any of Aspects 21 to 34, further comprising: providing an image supplied by a user to the generative response engine; and obtaining, from the generative response engine, a second patch comprising instructions to modify an appearance of the bespoke application.

Aspect 36. The method of Aspect 35, wherein the second patch comprises style information for applying to at least one component.

Aspect 37. The method of Aspect 36, wherein the style information comprises predefined classes associated with a style library to apply to a headless component library.

Aspect 38. The method of any of Aspects 36 to 37, wherein the style information comprises individual styles to apply to a headed component library.

Aspect 39. The method of any of Aspects 21 to 38, further comprising: retrieving at least one package from a package repository in response to the first patch, wherein the first patch includes instructions associated with the at least one package.

Aspect 40. The method of any of Aspects 21 to 39, further comprising: obtaining, from the generative response engine, a second patch based on a second user input, the second patch comprising instructions associated a configuration file; and modifying the configuration file based on the second patch.

Aspect 41. The method of Aspect 40, wherein the configuration file comprises at least one of a project configuration, a typescript configuration, a linter configuration, an environment definition, a testing configuration or test, and a development server configuration.

Aspect 42. The method of any of Aspects 21 to 41, wherein the instructions to modify the bespoke application limit modifications to specific component based on a mouse input event associated with the bespoke application.

Aspect 43. A computing device including at least one memory and at least one processor coupled to the at least one memory and configured to: display a first component for editing a bespoke application; provide, based on input into the first component, a natural language request to a generative response engine, wherein the natural language request includes instructions to modify the bespoke application; obtain, from the generative response engine, a first patch associated with the input, the first patch comprising instructions corresponding to the natural language request; and modify the bespoke application to include the first patch.

Aspect 44. The computing device of Aspect 43, wherein the at least one processor is configured to: after modifying the bespoke application to include the first patch, render at least one component of the bespoke application modified based on the first patch, wherein a state of the at least one component is maintained.

Aspect 45. The computing device of any of Aspects 43 to 44, wherein the first patch comprises updated instructions associated with a module, a dependency graph, and an identifier associated with the module, wherein the module comprises one of a function, a class, or a component.

Aspect 46. The computing device of any of Aspects 43 to 45, wherein the first patch includes a change to a property of an object having data rendered in the DOM.

Aspect 47. The computing device of any of Aspects 43 to 46, wherein the first component comprises a text input component that is expressly associated with a child component of the bespoke application.

Aspect 48. The computing device of any of Aspects 43 to 47, wherein the first component comprises at least a text input control and a style control for modifying a child component of the bespoke application.

Aspect 49. The computing device of Aspect 48, wherein the first patch is configured to apply to functional or style changes to the child component based on the input into the first component.

Aspect 50. The computing device of any of Aspects 48 to 49, wherein the first component is displayed based on hovering a cursor or a touch input associated with the child component.

Aspect 51. The computing device of any of Aspects 48 to 50, wherein the first component includes a text description associated with a function of the child component.

Aspect 52. The computing device of any of Aspects 43 to 51, wherein the at least one processor is configured to: obtain, from the generative response engine, a plan associated with a feature to incorporate into the bespoke application, wherein the plan includes a plurality of tasks to implement the feature into the bespoke application; display a user interface including the plurality of tasks for approval.

Aspect 53. The computing device of Aspect 52, wherein the user interface includes an input component for receiving a parameter associated with an external source corresponding to the feature.

Aspect 54. The computing device of Aspect 53, wherein the parameter includes a key for accessing the external source.

Aspect 55. The computing device of any of Aspects 52 to 54, wherein the first patch is received from the generative response engine and modifies the bespoke application while the generative response engine is performing the plurality of tasks.

Aspect 56. The computing device of any of Aspects 52 to 55, wherein the at least one processor is configured to: receive at least one patch corresponding to the feature; and modifying the bespoke application to include the at least one patch.

Aspect 57. The computing device of any of Aspects 43 to 56, wherein the at least one processor is configured to: provide an image supplied by a user to the generative response engine; and obtain, from the generative response engine, a second patch comprising instructions to modify an appearance of the bespoke application.

Aspect 58. The computing device of Aspect 57, wherein the second patch comprises style information for applying to at least one component.

Aspect 59. The computing device of Aspect 58, wherein the style information comprises predefined classes associated with a style library to apply to a headless component library.

Aspect 60. The computing device of any of Aspects 58 to 59, wherein the style information comprises individual styles to apply to a headed component library.

Aspect 61. The computing device of any of Aspects 43 to 60, wherein the at least one processor is configured to: retrieve at least one package from a package repository in response to the first patch, wherein the first patch includes instructions associated with the at least one package.

Aspect 62. The computing device of any of Aspects 43 to 61, wherein the at least one processor is configured to: obtain, from the generative response engine, a second patch based on a second user input, the second patch comprising instructions associated a configuration file; and modifying the configuration file based on the second patch.

Aspect 63. The computing device of Aspect 62, wherein the configuration file comprises at least one of a project configuration, a typescript configuration, a linter configuration, an environment definition, a testing configuration or test, and a development server configuration.

Aspect 64. The computing device of any of Aspects 43 to 63, wherein the instructions to modify the bespoke application limit modifications to specific component based on a mouse input event associated with the bespoke application.

What is claimed is:

1. A method comprising:
receiving, by a front end to a generative response engine, a first prompt to generate a bespoke application, wherein the front end includes a prompt input and a main content area;
responsive to the first prompt, obtaining code for the bespoke application, wherein the code includes subsets that correspond to at least one feature within the first prompt;
executing the code for the bespoke application;
based on the executing the code for the bespoke application, rendering a user interface of the bespoke application within the main content area of the front end;
based on detecting a user input event associated with a component of the user interface, rendering a popup in the main content area displaying the user interface for modifying the component;
receiving a first input into the popup to adjust a visual aspect of the component, wherein the popup includes controls to modify styling attributes corresponding to the visual aspect of the component; and
generating a modification to a first code subset to correspond to the first input from the generative response engine.

2. The method of claim 1, further comprising:
receiving a second prompt within the prompt input, wherein the second prompt requests the modification to the bespoke application;
responsive to the second prompt, obtaining revised code for a second code subset; and
rendering a portion of the bespoke application corresponding to the revised code.

3. The method of claim 1, wherein the first input comprises a natural language instruction identifying the at least one feature to add to the user interface.

4. The method of claim 1, further comprising:
providing each component associated with the bespoke application with a unique identifier; and
based on identification of an input event associated with a corresponding component, displaying the prompt input proximate to the corresponding component.

5. The method of claim 4, wherein the prompt input is associated with the front end and is not included in the bespoke application.

6. The method of claim 4, further comprising:
providing a prompt associated with modifying the corresponding component to the generative response engine, wherein the prompt includes the corresponding component.

7. The method of claim 1, further comprising:
obtaining, from the generative response engine, a plan associated with a feature to incorporate into the bespoke application, wherein the plan includes a plurality of tasks to implement the feature into the bespoke application; and
displaying a modal including the plurality of tasks for approval.

8. The method of claim 7, wherein the modal includes an input component for receiving a parameter associated with an external source corresponding to the feature.

9. The method of claim 8, wherein the parameter includes a key for accessing the external source.

10. The method of claim 7, wherein the first code subset is received from the generative response engine and modifies the bespoke application while the generative response engine is performing the plurality of tasks.

11. A method of building an application within a document object model (DOM), comprising:
based on a user input event associated with a component of a user interface of a bespoke application, displaying a popup for editing the bespoke application, wherein the popup includes a text input component for modifying a child component of the bespoke application;
providing, based on input into the text input component of the popup, a natural language request to a generative response engine, wherein the natural language request includes instructions that are scoped to modify a function of the child component;
obtaining, from the generative response engine, a first patch associated with the input to modify the child component and corresponding components within a hierarchy of the child component based on the natural language request; and
modifying the bespoke application to include the first patch.

12. The method of claim 11, further comprising:

after modifying the bespoke application to include the first patch, rendering at least one component of the bespoke application modified based on the first patch, wherein a state of the at least one component is maintained.

13. The method of claim 11, wherein the first patch comprises updated instructions associated with a module, a dependency graph, and an identifier associated with the module.

14. The method of claim 11, wherein the first patch includes a change to a property of an object having data rendered in the DOM.

15. The method of claim 11, wherein an outer application is configured to instrument unique ephemeral identifiers within the bespoke application during runtime of the outer application and detect the user input event based on a bubbled event from the bespoke application including a corresponding unique ephemeral identifier, and wherein the unique identifiers.

16. The method of claim 11, wherein the popup comprises a style control for modifying styling attributes of the child component of the bespoke application.

17. The method of claim 11, wherein the first patch is configured to apply to functional or style changes to the child component based on the input into the popup.

18. The method of claim 11, wherein the popup is displayed based on hovering a cursor or a touch input associated with the child component.

19. The method of claim 11, wherein the popup includes a text description associated with the function of the child component.

20. The method of claim 11, further comprising:

obtaining, from the generative response engine, a plan associated with a feature to incorporate into the bespoke application, wherein the plan includes a plurality of tasks to implement the feature into the bespoke application; and displaying a user interface including the plurality of tasks for approval.

21. The method of claim 20, wherein the user interface includes an input component for receiving a parameter associated with an external source corresponding to the feature.

22. The method of claim 21, wherein the parameter includes a key for accessing the external source.

23. The method of claim 20, wherein the first patch is received from the generative response engine and modifies the bespoke application while the generative response engine is performing the plurality of tasks.

24. The method of claim 20, further comprising:

receiving at least one patch corresponding to the feature; and modifying the bespoke application to include the at least one patch.

25. The method of claim 11, further comprising:

providing an image supplied by a user to the generative response engine; and obtaining, from the generative response engine, a second patch comprising instructions to modify an appearance of the bespoke application.

26. The method of claim 25, wherein the second patch comprises style information for applying to at least one component.

27. The method of claim 26, wherein the style information comprises predefined classes associated with a style library to apply to a headless component library.

28. The method of claim 26, wherein the style information comprises individual styles to apply to a headed component library.

29. The method of claim 11, further comprising:

retrieving at least one package from a package repository in response to the patch, wherein the patch includes instructions associated with the at least one package.

30. The method of claim 11, further comprising:

obtaining, from the generative response engine, a second patch based on a second user input, the second patch comprising instructions associated a configuration file; and modifying the configuration file based on the second patch.

* * * * *